United States Patent
Tsurumoto

(10) Patent No.: US 8,216,073 B2
(45) Date of Patent: Jul. 10, 2012

(54) GAME DEVICE, CONTROL METHOD OF GAME DEVICE AND INFORMATION STORAGE MEDIUM

(75) Inventor: Kazuma Tsurumoto, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 359 days.

(21) Appl. No.: 12/531,180

(22) PCT Filed: Dec. 11, 2007

(86) PCT No.: PCT/JP2007/073846
§ 371 (c)(1),
(2), (4) Date: Sep. 14, 2009

(87) PCT Pub. No.: WO2008/111272
PCT Pub. Date: Sep. 18, 2008

(65) Prior Publication Data
US 2010/0099469 A1    Apr. 22, 2010

(30) Foreign Application Priority Data
Mar. 13, 2007    (JP) .................................. 2007-063790

(51) Int. Cl.
*A63F 9/24* (2006.01)
(52) U.S. Cl. ...................... 463/43; 463/1; 463/4; 463/31
(58) Field of Classification Search .................. 463/1, 4, 463/31, 32, 43
See application file for complete search history.

(56) References Cited

U.S. PATENT DOCUMENTS

| | | | | |
|---|---|---|---|---|
| 6,149,520 | A * | 11/2000 | Takatsuka | 463/4 |
| 7,390,254 | B2 * | 6/2008 | Hirai | 463/4 |
| 7,399,224 | B2 * | 7/2008 | Hirai | 463/4 |
| 7,785,199 | B2 * | 8/2010 | Nishimura et al. | 463/31 |
| 8,016,673 | B2 * | 9/2011 | Takatsuka | 463/32 |
| 2003/0144045 | A1 * | 7/2003 | Fujita | 463/1 |

(Continued)

FOREIGN PATENT DOCUMENTS

EP    1557211 A1    7/2005

(Continued)

OTHER PUBLICATIONS

International Search Report of PCT/JP2007/073846 dated Jan. 15, 2008.

(Continued)

*Primary Examiner* — David L Lewis
*Assistant Examiner* — Shauna-Kay Hall
(74) *Attorney, Agent, or Firm* — Sughrue Mion, PLLC

(57) ABSTRACT

A game device capable of realizing a user interface which allows a user to instruct a mobile character to stay within a predetermined region in a case where a movement target position for the mobile character is set outside the predetermined region while preventing the mobile character from exhibiting an unnatural action at a time of changing a moving direction is provided. In the game device, a mobile character which has arrived at a region whose distance from an intersection is equal to or less than a first reference distance is caused to move in parallel with a direction from the intersection towards another intersection, and a mobile character which has arrived at a region whose distance from the intersection is equal to or less than a second reference distance is caused to move toward a movement target position.

4 Claims, 14 Drawing Sheets

U.S. PATENT DOCUMENTS

| | | |
|---|---|---|
| 2007/0018968 A1 | 1/2007 | Iwamoto et al. |
| 2007/0052177 A1 | 3/2007 | Ikeda et al. |

FOREIGN PATENT DOCUMENTS

| | | |
|---|---|---|
| GB | 2365362 A | 2/2002 |
| JP | 07-244556 A | 9/1995 |
| JP | 10-333834 A | 12/1998 |
| JP | 3262677 B2 | 3/2002 |
| JP | 2007-026129 A | 2/2007 |
| JP | 2007-054114 A | 3/2007 |

OTHER PUBLICATIONS

Supplementary European Search Report corresponding to European Patent Application No. 07850412.3, dated Feb. 12, 2010.

* cited by examiner

FIG.14
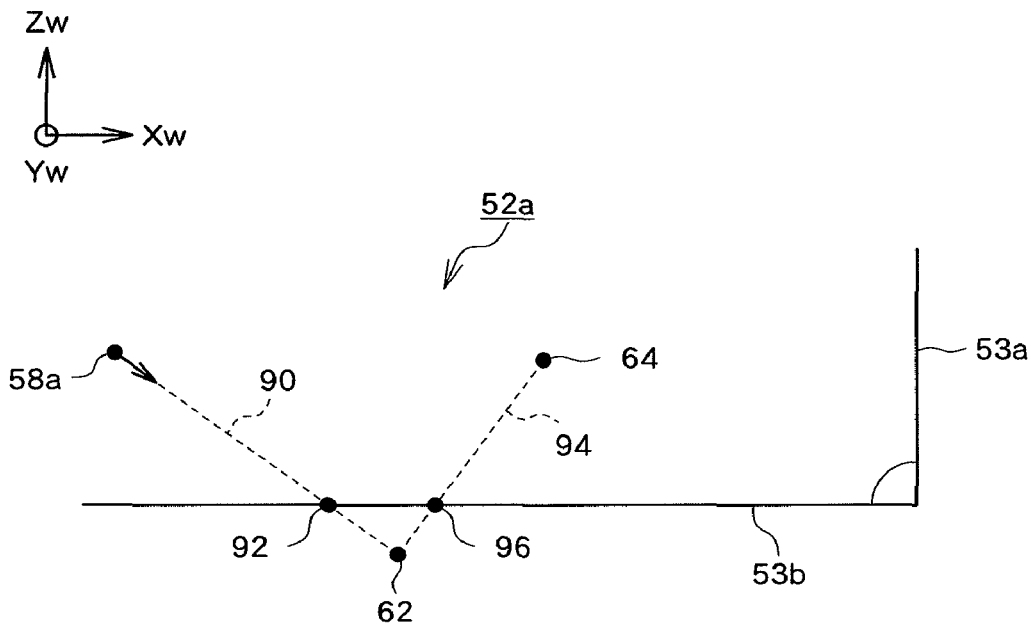
FIG.15
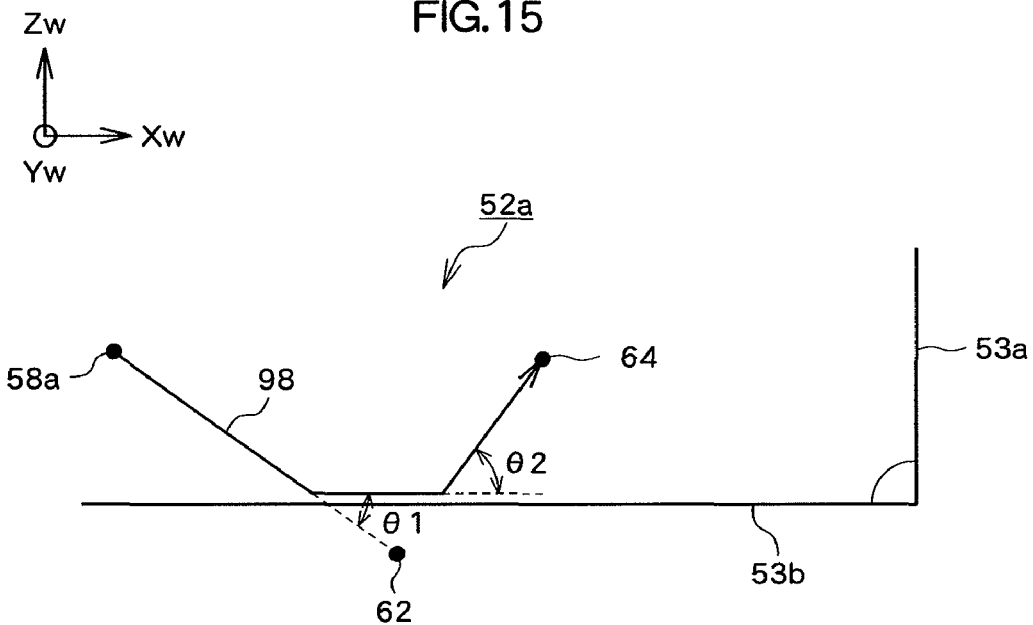
FIG.16
| MOVING ACTION TYPE | REFERENCE DISTANCE |
|---|---|
| NORMAL RUNNING | L 1 |
| DASH RUNNING | L 2 |
※L 1＜L 2

GAME DEVICE, CONTROL METHOD OF GAME DEVICE AND INFORMATION STORAGE MEDIUM

TECHNICAL FIELD

The present invention relates to a game device, a control method for a game device, and an information storage medium.

BACKGROUND ART

There is known a game device in which a screen coordinate value (coordinate value in a screen coordinate system) is acquired according to a user's operation to advance a game based on the screen coordinate value. For example, there is known a game device in which a game is advanced based on a screen coordinate value input by using a mouse, a touch panel, or a pointing device such as an information input device disclosed in Patent Document 1.
Patent Document 1: JP3262677B

DISCLOSURE OF THE INVENTION

Problems to be Solved by the Invention

On such a game device described above, it is possible to realize, for example, such a game as to allow a user to designate a movement target position of a mobile character by using the pointing device to point at the movement target position within a game screen. For example, it is possible to realize such a soccer game as to allow the user to designate a movement target position for a player object by using the pointing device to point at a position within a game screen.

In such a soccer game as described above, there is an imaginable case where the user may cause the movement target position for the player object of a user's operation subject (herein, referred to as "user object") to be set outside a pitch. Note that the pitch represents a region surrounded by goal lines and touch lines. FIG. 18 is a diagram illustrating an example of the movement target position for the user object. For example, in a case where such a position 62 outside a pitch 52a as illustrated in FIG. 18 has been erroneously set as the movement target position for a user object 58a that is dribbling within the pitch 52a, it is undesirable because it would allow an opposing team to receive a throw-in if the user object 58a reaches the movement target position (position 62). Therefore, in order to realize the above-mentioned soccer game, it is necessary to realize such a user interface as to allow the user to instruct the user object 58a to stay within the pitch 52a in the case where the movement target position for the user object 58a has been erroneously set outside the pitch 52a.

As a method for realizing such a user interface, there may be conceived a method of, for example, allowing the user to cancel the movement target position outside the pitch 52a which has been erroneously set. However, if the movement target position is canceled while the user object is moving, there is a case where an action of the user object becomes unnatural. Further, the canceling of the movement target position while the user object is moving is not preferable because the user object may move in an unexpected direction.

Alternatively, as another method for realizing the above-mentioned user interface (method other than the method of allowing the user to cancel the movement target position), there may be conceived a method of controlling the user object 58a to stay within the pitch 52a in a case where the user sets a position 64 within the pitch 52a, as illustrated, for example, in FIG. 18, as a new movement target position (herein, referred to as "second movement target position") while the user object 58a is moving toward the movement target position set outside the pitch 52a (herein, referred to as "first movement target position"). As a mode of such control, there may be conceived a mode of performing movement control on the user object 58a so that the user object 58a moves along a path 66 as illustrated in, for example, FIG. 19. That is, there may be conceived a mode of performing movement control on the user object 58a so that, when the user object 58a moving toward the first movement target position (position 62) reaches the immediate vicinity of a goal line 53a or a touch line 53b, the user object 58a starts to move toward the second movement target position (position 64) at that time point.

However, if the mode as described above is employed, there is a case where an angle θ between a moving direction of the user object 58a moving toward the first movement target position (position 62) and a moving direction of the user object 58a moving toward the second movement target position (position 64) becomes relatively large. As a result, there is a case where the user object 58a exhibits an unnatural action at a time of changing the moving direction.

The present invention has been made in view of the above-mentioned problems, and an object thereof is to provide a game device, a control method for a game device, and an information storage medium, which are capable of realizing such a user interface as to allow a user to instruct a mobile character to stay within a predetermined region in the case where a movement target position for the mobile character is set outside the predetermined region while preventing the mobile character from exhibiting an unnatural action at the time of changing a moving direction.

Means for Solving the Problems

In order to solve the above-mentioned problems, according to the present invention, a game device, which executes a game in which a mobile character moves toward a movement target position designated by a user, includes: first judgment means for judging whether or not a position outside a predetermined region has been designated as a first movement target position for the mobile character in a case where the mobile character is located within the predetermined region; second judgment means for judging whether or not a position within the predetermined region has been designated as a second movement target position for the mobile character after it is judged by the first judgment means that the position outside the predetermined region has been designated as the first movement target position in the case where the mobile character is located within the predetermined region; first intersection acquisition means for acquiring a first intersection between a straight line connecting a current position of the mobile character and the first movement target position and a boundary line of the predetermined region if it is judged by the first judgment means that the position outside the predetermined region has been designated as the first movement target position; second intersection acquisition means for acquiring a second intersection between a straight line connecting the first movement target position and the second movement target position, and the boundary line of the predetermined region, if it is judged by the second judgment means that the position within the predetermined region has been designated as the second movement target position; and movement control means for executing movement control for the mobile character based on the first intersection and the second intersection, and the movement control means includes: means for moving the mobile character toward the first movement target position if it is judged by the first judgment means that the position outside the predetermined region has been designated as the first movement target position; means for judging whether or not the mobile character has arrived at a region whose distance from the first intersection is equal to or less than a first reference distance; means for moving the mobile character in parallel with a direction from the first intersection toward the second intersection if it is judged that the mobile character has arrived at the region whose distance from the first intersection is equal to or less than the first reference distance; means for judging whether or not the mobile character has arrived at a region whose distance from the second intersection is equal to or less than a second reference distance; and means for moving the mobile character toward the second movement target position if it is judged that the mobile character has arrived at the region whose distance from the second intersection is equal to or less than the second reference distance.

Further, according to the present invention, a control method for a game device which executes a game in which a mobile character moves toward a movement target position designated by a user, includes: a first judgment step of judging whether or not a position outside a predetermined region has been designated as a first movement target position for the mobile character in a case where the mobile character is located within the predetermined region; a second judgment step of judging whether or not a position within the predetermined region has been designated as a second movement target position for the mobile character after it is judged in the first judgment step that the position outside the predetermined region has been designated as the first movement target position in the case where the mobile character is located within the predetermined region; a first intersection acquisition step of acquiring a first intersection between a straight line connecting a current position of the mobile character and the first movement target position and a boundary line of the predetermined region if it is judged in the first judgment step that the position outside the predetermined region has been designated as the first movement target position; a second intersection acquisition step of acquiring a second intersection between a straight line connecting the first movement target position and the second movement target position, and the boundary line of the predetermined region, if it is judged in the second judgment step that the position within the predetermined region has been designated as the second movement target position; and a movement control step of executing movement control for the mobile character based on the first intersection and the second intersection, and the movement control step includes the steps of: moving the mobile character toward the first movement target position if it is judged in the first judgment step that the position outside the predetermined region has been designated as the first movement target position; judging whether or not the mobile character has arrived at a region whose distance from the first intersection is equal to or less than a first reference distance; moving the mobile character in parallel with a direction from the first intersection toward the second intersection if it is judged that the mobile character has arrived at the region whose distance from the first intersection is equal to or less than the first reference distance; judging whether or not the mobile character has arrived at a region whose distance from the second intersection is equal to or less than a second reference distance; and moving the mobile character toward the second movement target position if it is judged that the mobile character has arrived at the region whose distance from the second intersection is equal to or less than the second reference distance.

Further, a program according to the present invention causes a computer such as a home-use game device, a portable game device, a business-use game device, a mobile phone, a personal digital assistant (PDA), or a personal computer to function as a game device which executes a game in which a mobile character moves toward a movement target position designated by a user, the program causes the computer to function as: first judgment means for judging whether or not a position outside a predetermined region has been designated as a first movement target position for the mobile character in a case where the mobile character is located within the predetermined region; second judgment means for judging whether or not a position within the predetermined region has been designated as a second movement target position for the mobile character after it is judged by the first judgment means that the position outside the predetermined region has been designated as the first movement target position in the case where the mobile character is located within the predetermined region; first intersection acquisition means for acquiring a first intersection between a straight line connecting a current position of the mobile character and the first movement target position and a boundary line of the predetermined region if it is judged by the first judgment means that the position outside the predetermined region has been designated as the first movement target position; second intersection acquisition means for acquiring a second intersection between a straight line connecting the first movement target position and the second movement target position, and the boundary line of the predetermined region, if it is judged by the second judgment means that the position within the predetermined region has been designated as the second movement target position; and movement control means for executing movement control for the mobile character based on the first intersection and the second intersection, and the movement control means includes: means for moving the mobile character toward the first movement target position if it is judged by the first judgment means that the position outside the predetermined region has been designated as the first movement target position; means for judging whether or not the mobile character has arrived at a region whose distance from the first intersection is equal to or less than a first reference distance; means for moving the mobile character in parallel with a direction from the first intersection toward the second intersection if it is judged that the mobile character has arrived at the region whose distance from the first intersection is equal to or less than the first reference distance; means for judging whether or not the mobile character has arrived at a region whose distance from the second intersection is equal to or less than a second reference distance; and means for moving the mobile character toward the second movement target position if it is judged that the mobile character has arrived at the region whose distance from the second intersection is equal to or less than the second reference distance.

Further, an information storage medium according to the present invention is a computer-readable information storage medium recorded with the above-mentioned program. Further, a program delivery device according to the present invention is a program delivery device including an information storage medium recorded with the above-mentioned program, for reading the above-mentioned program from the information storage medium and delivering the program. Further, a program delivery method according to the present invention is a program delivery method of reading the above-mentioned program from an information storage medium recorded with the above-mentioned program and delivering the program.

In the present invention, a game in which a mobile character moves toward a movement target position designated by a user is executed. In the present invention, it is judged whether or not a position outside a predetermined region has been designated as a first movement target position for the mobile character in a case where the mobile character is located within the predetermined region. Further, it is judged whether or not a position within the predetermined region has been designated as a second movement target position for the mobile character after it is judged that the position outside the predetermined region has been designated as the first movement target position in the case where the mobile character is located within the predetermined region. If it is judged that the position outside the predetermined region has been designated as the first movement target position, a first intersection between a straight line connecting a current position of the mobile character and the first movement target position and a boundary line of the predetermined region is acquired. If it is judged that the position within the predetermined region has been designated as the second movement target position, a second intersection between a straight line connecting the first movement target position and the second movement target position and the boundary line of the predetermined region is acquired. Then, movement control for the mobile character is executed based on the first intersection and the second intersection. Specifically, if it is judged by the first judgment means that the position outside the predetermined region has been designated as the first movement target position, the mobile character is caused to move toward the first movement target position. After that, it is judged whether or not the mobile character has arrived at a region whose distance from the first intersection is equal to or less than a first reference distance. If it is judged that the mobile character has arrived at the region whose distance from the first intersection is equal to or less than the first reference distance, the mobile character is caused to move in parallel with a direction from the first intersection toward the second intersection. After that, it is judged whether or not the mobile character has arrived at a region whose distance from the second intersection is equal to or less than a second reference distance. If it is judged that the mobile character has arrived at the region whose distance from the second intersection is equal to or less than the second reference distance, the mobile character is caused to move toward the second movement target position. According to the present invention, it is possible to realize such a user interface as to allow a user to instruct a mobile character to stay within a predetermined region in the case where a movement target position for the mobile character is set outside the predetermined region so as to prevent the mobile character from exhibiting an unnatural action at the time of changing a moving direction.

Further, according to an aspect of the present invention, the movement control means may include: reference distance information storage means for storing reference distance information in which a movement mode condition for a movement mode of the mobile character and a reference distance are associated with each other; and means for deciding, as the first reference distance, the reference distance associated with the movement mode condition satisfied by a movement mode of the mobile character moving toward the first movement target position.

BRIEF DESCRIPTION OF THE DRAWINGS

FIG. 14 is a diagram for describing the processing executed on the game device;

FIG. 15 is a diagram illustrating an example of movement control for a user object according to the embodiment;

FIG. 16 is a diagram illustrating an example of a reference distance table;

BEST MODE FOR CARRYING OUT THE INVENTION

Hereinafter, detailed description is given of an example of an embodiment of the present invention based on the drawings. A game device according to the embodiment of the present invention is implemented by, for example, a home-use game device, a portable game device, a mobile phone, a personal digital assistant (PDA), or a personal computer. Herein, description is given of a case where the game device according to the embodiment of the present invention is implemented by a home-use game device.

Figure 1:
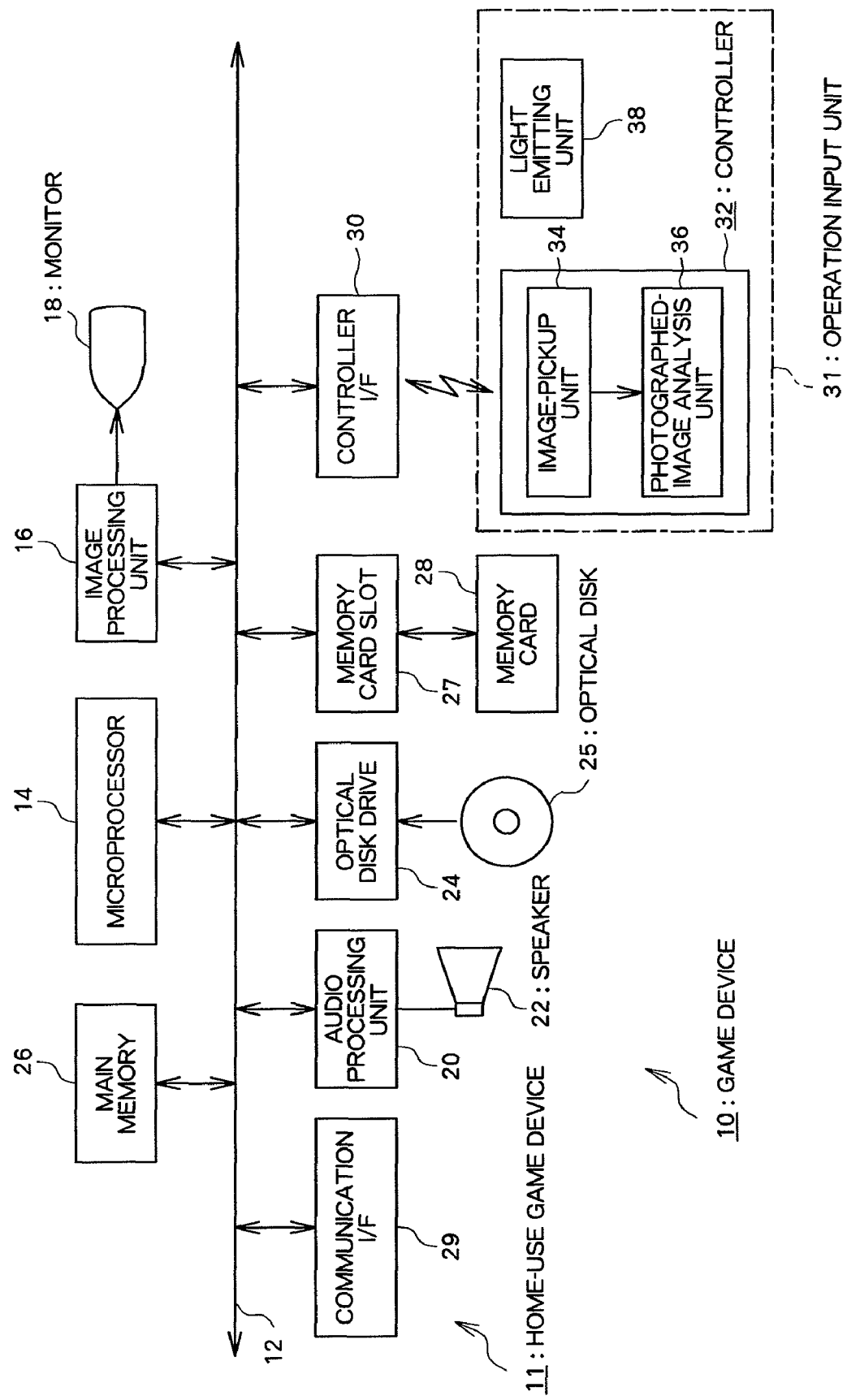
FIG. 1 is a diagram illustrating a hardware configuration of a game device according to an embodiment of the present invention.

FIG. 1 is a diagram illustrating a configuration of the game device according to the embodiment of the present invention. A game device 10 illustrated in FIG. 1 includes a home-use game device 11, an optical disk 25, a memory card 28, a monitor 18, and a speaker 22. The optical disk 25 and the memory card 28 are information storage media. The optical disk 25 and the memory card 28 are inserted into the home-use game device 11. The monitor 18 and the speaker 22 are connected to the home-use game device 11. A CD-ROM or a DVD-ROM, for example, is used as the optical disk 25. A household television set, for example, is used as the monitor 18. A speaker built into the household television set, for example, is used as the speaker 22.

The home-use game device 11 is a well-known computer game system. The home-use game device 11 includes a bus 12, a microprocessor 14, an image processing unit 16, an audio processing unit 20, an optical disk drive 24, a memory card slot 27, a communication interface (I/F) 29, a controller interface (I/F) 30, and an operation input unit 31. The configurational components other than the operation input unit 31 are accommodated in a casing of the home-use game device 11.

The bus 12 is for exchanging addresses and data among the units of the home-use game device 11. The microprocessor 14, the image processing unit 16, the audio processing unit 20, the optical disk drive 24, a main memory 26, the memory card slot 27, the communication interface 29, and the controller interface 30 are connected via the bus 12 so as to communicate data with one another.

The microprocessor 14 controls the individual units of the home-use game device 11 in accordance with an operating system stored in a ROM (not shown), a program or data read from the optical disk 25 or the memory card 28. The main memory 26 includes, for example, a RAM. The program or data read from the optical disk 25 or the memory card 28 are written in the main memory 26 if necessary. The main memory 26 is also used for a working memory of the microprocessor 14.

The image processing unit 16 includes a VRAM. Based on image data sent from the microprocessor 14, the image processing unit 16 renders a game screen in the VRAM. Then, the image processing unit 16 converts the game screen into video signals and outputs the video signals to the monitor 18 at predetermined timings. The audio processing unit 20 includes a sound buffer. The sound buffer stores various categories of sound data such as game music, game sound effects, and messages that are read from the optical disk 25. The audio processing unit 20 reproduces the various categories of sound data stored in the sound buffer, and outputs the reproduced sound data from the speaker 22.

The optical disk drive 24 reads the program or data recorded on the optical disk 25 in accordance with an instruction given from the microprocessor 14. In this case, the optical disk 25 is employed for supplying the program or data to the home-use game device 11, but any other information storage media such as ROM cards may also be used. Further, the program or data may also be supplied to the home-use game device 11 from a remote location via a data communication network such as the Internet.

The memory card slot 27 is an interface for insertion of the memory card 28. The memory card 28 includes a nonvolatile memory (for example, EEPROM). The memory card 28 is used for storing various kinds of game data such as saved data. The communication interface 29 is an interface for communicative connection to a data communication network such as the Internet.

The controller interface 30 is an interface for allowing a plurality of controllers 32 to perform wireless connection. As the controller interface 30, it is possible to use, for example, an interface conforming to the Bluetooth interface standards. Note that the controller interface 30 may be an interface for allowing the controller 32 to perform wired connection.

Figure 2:
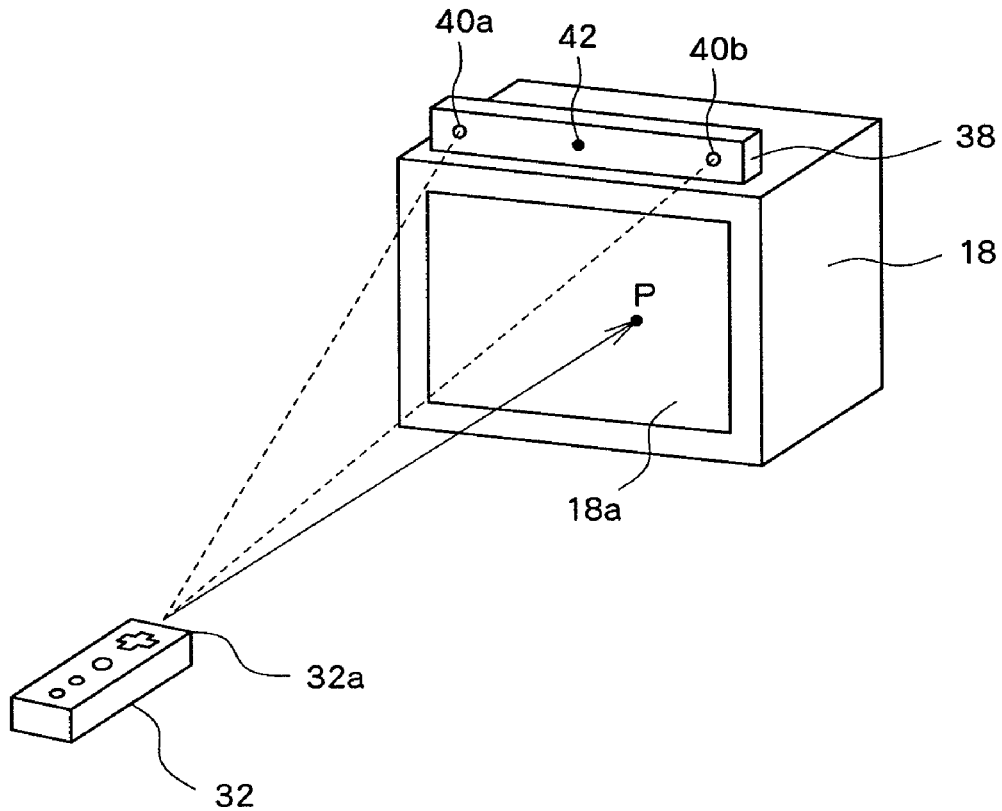
FIG. 2 is a diagram illustrating an example of an operation input unit.
Figure 3:
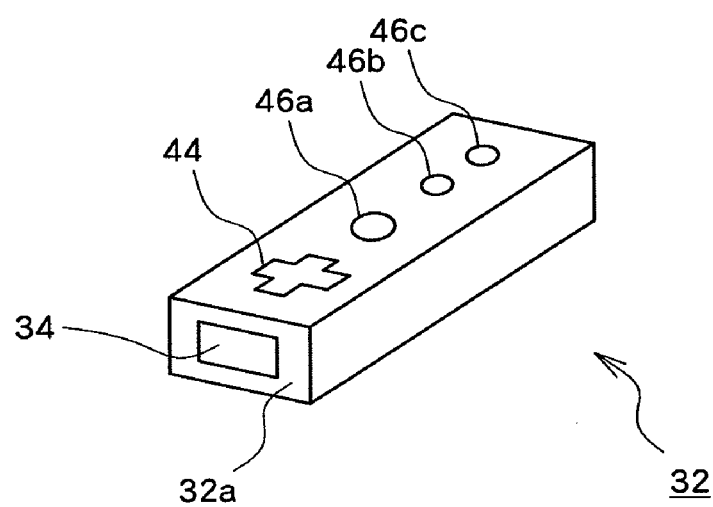
FIG. 3 is a diagram illustrating an example of a controller.

The operation input unit 31 is used for allowing a user to perform an operation input. The operation input unit 31 has a function as, for example, a pointing device for allowing the user to point to a position on the game screen displayed on the monitor 18. As the operation input unit 31, it is possible to use, for example, technology disclosed in JP3262677B. The operation input unit 31 includes one or a plurality of controllers 32 and one light emitting unit 38. The controllers 32 each include an image-pickup unit 34 and a photographed-image analysis unit 36. FIG. 2 is a diagram illustrating an example of the operation input unit 31. FIG. 3 is a diagram illustrating an example of the controller 32.

As illustrated in FIG. 2, the light emitting unit 38 is disposed on top of the monitor 18. It should be noted that the light emitting unit 38 may be disposed under the monitor 18. A plurality of light sources are set in the light emitting unit 38. In the example illustrated in FIG. 2, the light emitting unit 38 is provided with light sources 40a and 40b on both end portions thereof. As illustrated in FIG. 3, the controller 32 is provided with a direction button 44 and buttons 46a, 46b, and 46c on a surface thereof. The direction button 44 has a cross shape, and is generally used to instruct which direction a character or a cursor be moved in. The buttons 46a, 46b, and 46c are used for various kinds of game operations. The controller 32 is provided with, for example, the image-pickup unit 34 serving as an image-pickup element, such as a CCD, on a side surface thereof. In addition, the controller 32 has, for example, the photographed-image analysis unit 36, such as a microprocessor, built therein. Note that a side surface portion to which the image-pickup unit 34 is provided is referred to as a "front end portion 32a of the controller 32".

If the user aims the front end portion 32a of the controller 32 at the monitor 18, the light sources 40a and 40b are reflected on a photographed image of the image-pickup unit 34. The photographed-image analysis unit 36 analyzes the positions of the light sources 40a and 40b reflected on the photographed image of the image-pickup unit 34. The photographed-image analysis unit 36 acquires a position and an inclination of the controller 32 based on the analysis results. More specifically, the photographed-image analysis unit 36 calculates a relative position of the controller 32 with respect to a predetermined reference position 42 and an inclination angle of the controller 32 with respect to a straight line that connects the light sources 40a and 40b. The game device 10 stores information related to a positional relationship between the reference position 42 and a game screen 18a displayed on the monitor 18, and based on the information and the position and the inclination of the controller 32 acquired by the photographed-image analysis unit 36, a screen coordinate value of a position P pointed by the front end portion 32a of the controller 32 is acquired.

Figure 4:
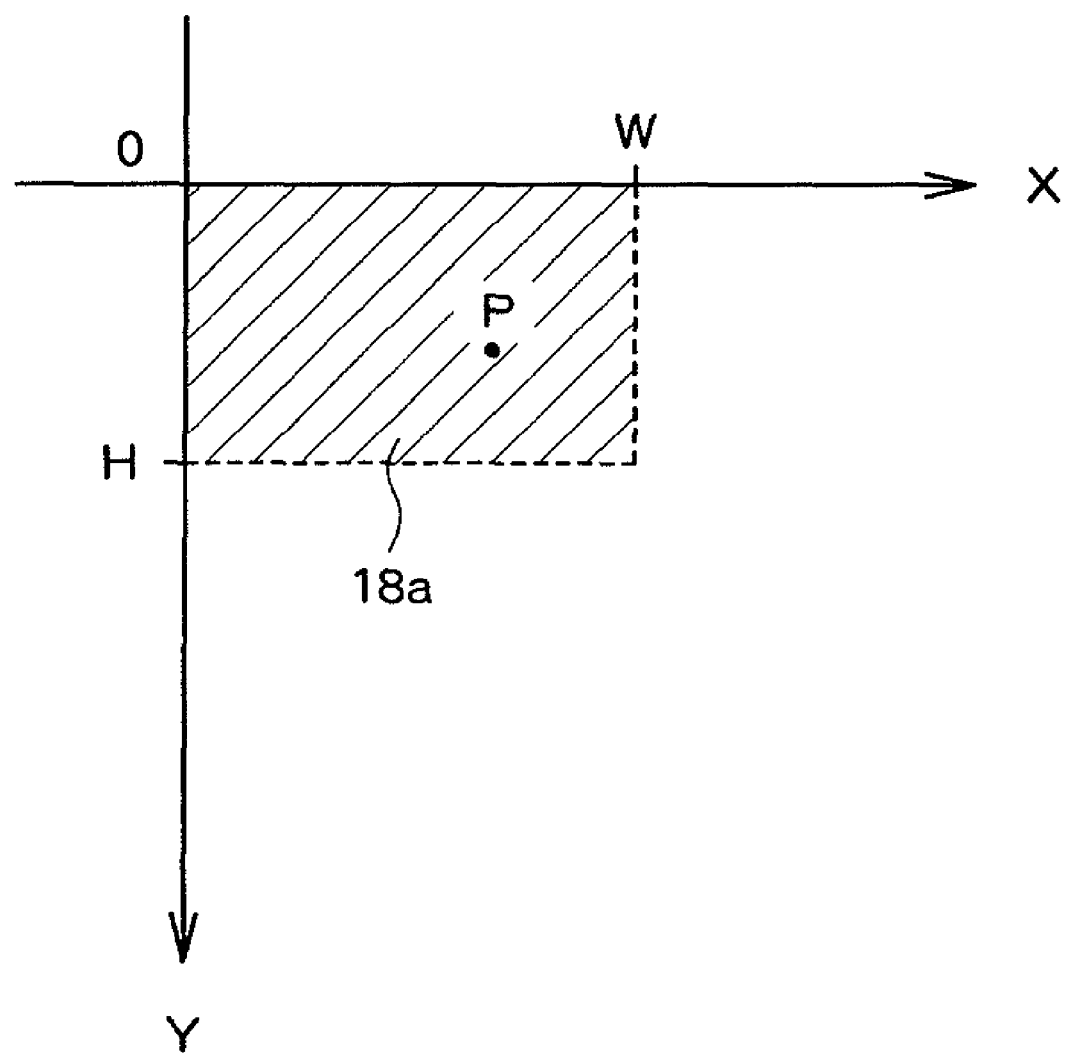
FIG. 4 is a diagram illustrating a screen coordinate system.

Here, the screen coordinate value represents a coordinate value in a screen coordinate system. As illustrated in FIG. 4, the screen coordinate system represents a coordinate system in which the origin point is set to the top left corner of the game screen 18a, the X-axis positive direction is set to the rightward direction of the game screen 18a, and the Y-axis positive direction is set to the downward direction of the game screen 18a. As illustrated in FIG. 4, a predetermined region in the screen coordinate system, that is, a region (diagonally shaded region) that satisfies the condition "$0 \leq X \leq W$ and $0 \leq Y \leq H$" is the region displayed on the monitor 18. Note that "W" denotes a width of the game screen 18a, and "H" denotes a height of the game screen 18a.

Note that the position P pointed by the front end portion 32a of the controller 32 is referred to as a "designation position of the controller 32". In addition, the information indicating the position and the inclination of the controller 32 acquired by the photographed-image analysis unit 36, that is, information for identifying the screen coordinate value of the designation position of the controller 32 is referred to as "pointing information".

An operation signal indicating an operation state of the controller 32 is transmitted every predetermined cycle (for example, every 1/60 seconds) from the controller 32 to the controller interface 30. The operation signal includes, for example, identification information for identifying the controller 32, the above-mentioned pointing information, and information indicating a depression state of each button. The controller interface 30 passes the operation signal received from the controller 32 to the microprocessor 14 via the bus 12.

The microprocessor 14 judges a game operation performed by each controller 32 based on the operation signal. For example, the microprocessor 14 identifies the designation position of each controller 32 based on the operation signal (pointing information). Further, for example, based on the operation signal, the microprocessor 14 judges whether or not a depression operation is performed on any one of the direction button 44 and the buttons 46a, 46b, and 46c on each controller 32.

On the game device 10 provided with the above-mentioned configuration, for example, a soccer game that imitates a soccer match between a user's operation subject team (hereinafter, referred to as "user team") and an opposing team is played. The soccer game is realized by executing a soccer game program read from the optical disk 25.

Figure 5:
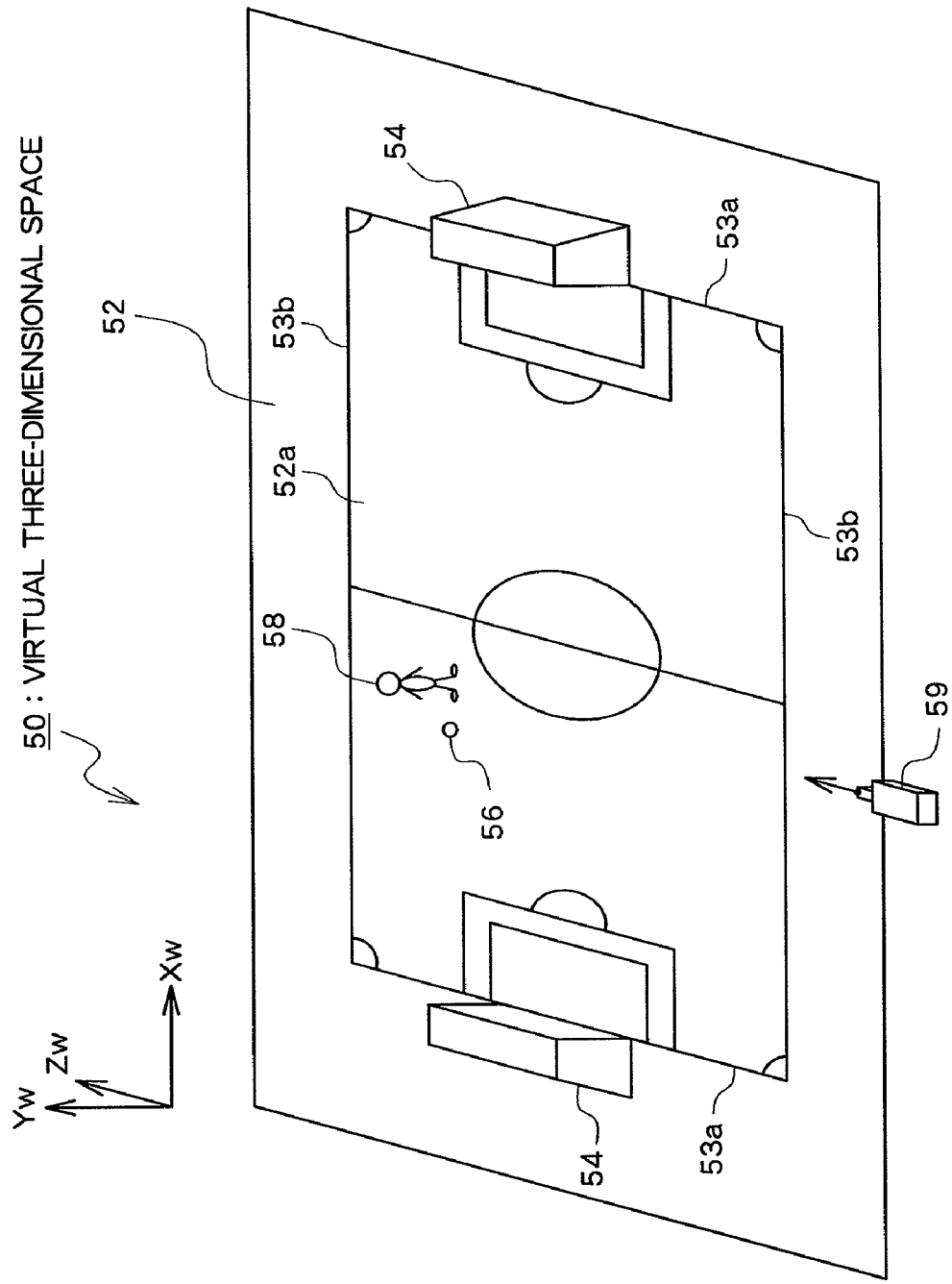
FIG. 5 is a diagram illustrating an example of a virtual three-dimensional space.

A virtual three-dimensional space (game space) is built in the main memory 26 of the game device 10. FIG. 5 illustrates an example of the virtual three-dimensional space. As illustrated in FIG. 5, a field object 52 representing a soccer field and goal objects 54, each representing a goal, are located in a virtual three-dimensional space 50, which forms a soccer match venue. Displayed on the field object 52 are goal lines 53a, touch lines 53b, and the like. A pitch 52a (predetermined region) is a region surrounded by the goal lines 53a (boundary lines) and the touch lines 53b (boundary lines).

Located on the field object 52 are a ball object 56 representing a soccer ball and a player object 58 (mobile character) representing a soccer player. Though omitted from FIG. 5, 11 player objects 58 belonging to the user team and 11 player objects 58 belonging to the opposing team are located on the field object 52. Any one of the 11 player objects 58 belonging to the user team acts according to the user's operation. Note that in the following description, the player object 58 that acts according to the user's operation is referred to as a "user object". The player objects 58 other than the user object act according to a predetermined algorithm.

A virtual camera 59 (viewpoint and viewing direction) is set in the virtual three-dimensional space 50. For example, the virtual camera 59 moves according to the movement of the ball object 56. A state of the virtual three-dimensional space 50 viewed from the virtual camera 59 is displayed on the game screen 18a.

Figure 6:
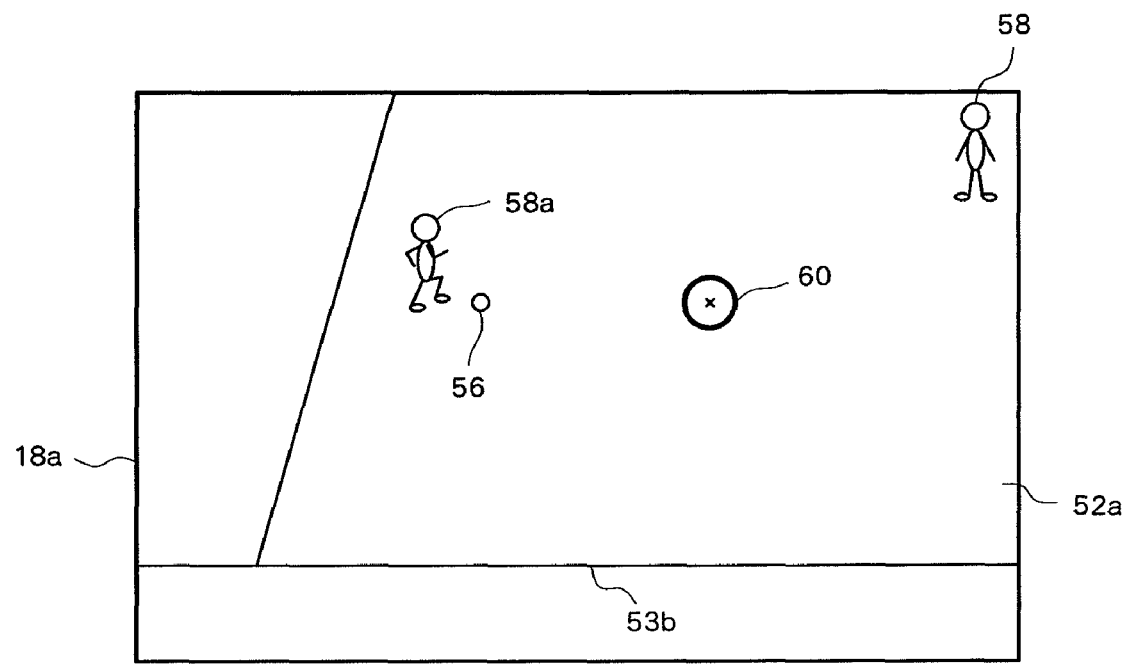
FIG. 6 is a diagram illustrating an example of a game screen.

FIG. 6 illustrates an example of the game screen 18a. As illustrated in FIG. 6, an image showing a state of the virtual three-dimensional space 50 viewed from the virtual camera 59 is displayed on the game screen 18a. The user object 58a and the other player object 58 are displayed on the game screen 18a illustrated in FIG. 6. Further displayed on the game screen 18a is a cursor 60 indicating the designation position of the controller 32. In the embodiment, the shape of the cursor 60 is a circular shape. It should be noted that the shape of the cursor 60 may be a shape other than the circular shape.

On the game screen 18a illustrated in FIG. 6, the user designates a moving direction of the user object 58a by pointing in a direction with the front end portion 32a of the controller 32. The user object 58a moves toward a position on the field object 52 corresponding to a display position of the cursor 60. Note that in a case where the user object 58a is keeping the ball object 56, the ball object 56 also moves toward the position on the field object 52 corresponding to a display position of the cursor 60. The state is shown as a dribbling action of the user object 58a.

Further, if the user depresses a movement target position setting button (for example, button 46b) for setting a movement target position, the position on the field object 52 corresponding to the display position of the cursor 60 at that time point is set as the movement target position. In this case, even if the user moves the cursor 60, the user object 58a keeps moving toward the movement target position. In a case where the user object 58a is keeping the ball object 56, the ball object 56 also moves toward the movement target position.

Note that in a case where the user sets a new movement target position (here, referred to as "second movement target position") while the user object 58a is moving toward the movement object position (here, referred to as "first movement target position"), as a rule, the user object 58a moves from the first movement target position toward the second movement target position after reaching the first movement target position.

Further, the user designates a kicking direction of the user object 58a by pointing a direction with the front end portion 32a of the controller 32. If the user depresses a kick instructing button (for example, button 46a), the user object 58a starts to kick the ball object 56 toward the position on the field object 52 corresponding to the display position of the cursor 60.

For example, the user sets the movement target position to thereby move the user object 58a toward the movement target position. Then, while the user object 58a is moving toward the movement target position, the user moves the cursor 60 to the position of another desired player object 58. By depressing the kick instructing button in that state, the user can cause the user object 58a to perform a pass toward the player object 58.

Figure 18:
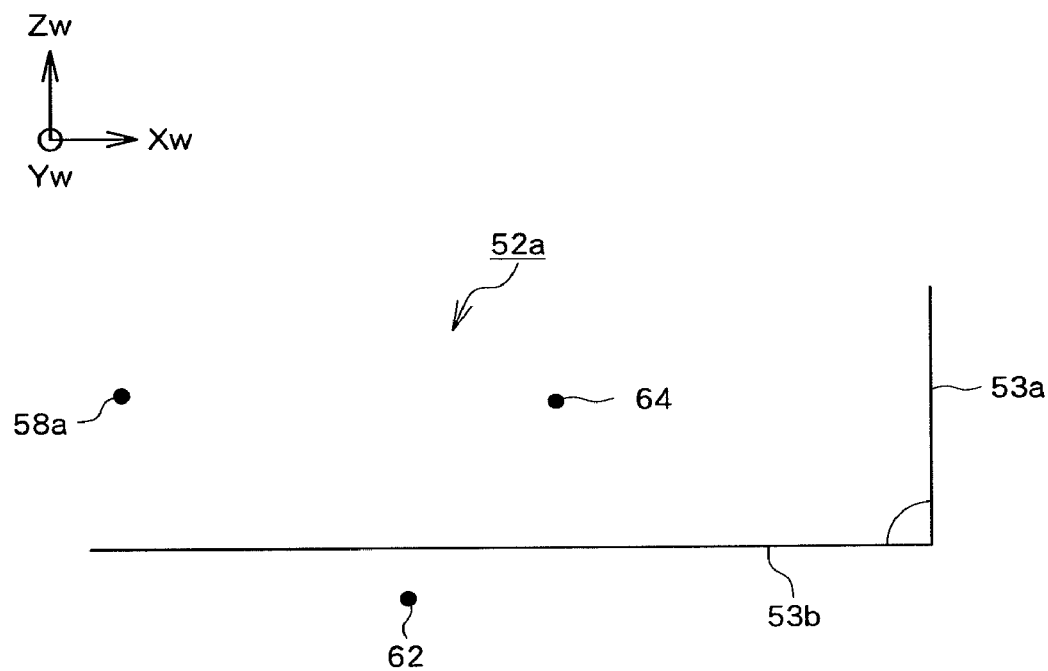
FIG. 18 is a diagram illustrating an example of a movement target position.

In the above-mentioned soccer game, there is a possibility of the user erroneously setting the movement target position outside the pitch 52a. For example, there is a possibility that the position 62 outside the pitch 52a as illustrated in, for example, FIG. 18 is erroneously set as the movement target position for the user object 58a that is dribbling within the pitch 52a. In such a case, it is undesirable because it would allow the opposing team to receive a throw-in if the user object 58a reaches the movement target position (position 62). In this respect, even in a case where the movement target position has been erroneously set outside the pitch 52a, the game device 10 is configured to keep the user object 58a within the pitch 52a if the user sets the position 64 within the pitch 52a as illustrated in, for example, FIG. 18 as a new movement target position.

Figure 19:
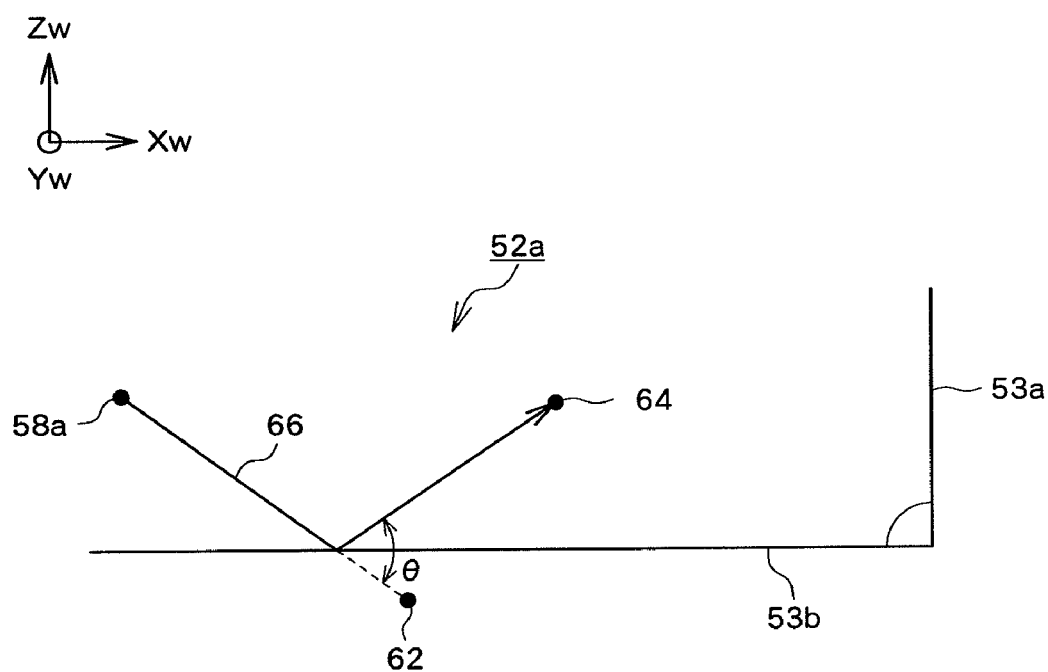
FIG. 19 is a diagram illustrating an example of the movement control for the user object.

To keep the user object 58a within the pitch 52a, there is an option to perform movement control on the user object 58a so that the user object 58a moves along a path 66 as illustrated in, for example, FIG. 19. That is, there is an option to cause the user object 58a to start to move toward the second movement target position (position 64) at a time point when the user object 58a reaches the immediate vicinity of the goal line 53a or the touch line 53b. However, if the option to perform the movement control as illustrated in, for example, FIG. 19 is employed, there is a case where an angle θ between a moving direction of the user object 58a reaching the goal line 53a or the touch line 53b and a moving direction of the user object 58a after reaching the goal line 53a or the touch line 53b becomes relatively large. Therefore, there is a case where the user object 58a exhibits an unnatural action at the time of changing the moving direction.

Hereinafter, description is given of technology for preventing the user object 58a from exhibiting an unnatural action at the time of changing the moving direction.

Figure 7:
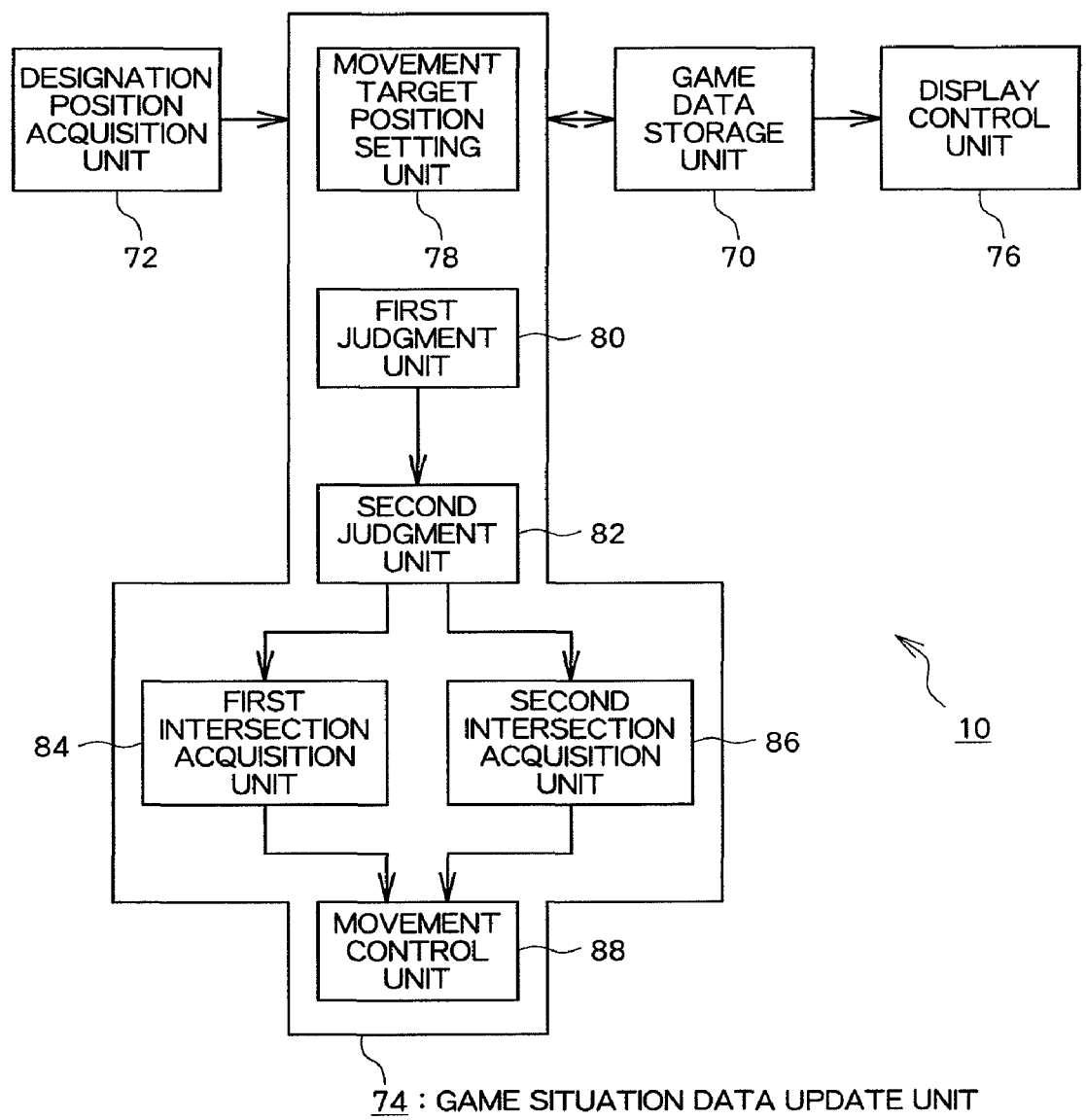
FIG. 7 is a functional block diagram of the game device according to the embodiment.

FIG. 7 is a functional block diagram mainly illustrating functions related to the present invention among the functions implemented by the game device 10. As illustrated in FIG. 7, the game device 10 functionally includes a game data storage unit 70, a designation position acquisition unit 72, a game situation data update unit 74, and a display control unit 76.

The game data storage unit 70 is implemented mainly by the main memory 26 and the optical disk 25. The game data storage unit 70 stores data based on which the game screen 18a is generated. For example, the game data storage unit 70 stores model data representing a shape of each of various kinds of objects located in the virtual three-dimensional space 50. In addition, for example, the game data storage unit 70 stores motion data representing a change in posture made by the player object 58 performing each of various kinds of actions. Examples of the motion data include running motion data representing the change in posture made by the player object 58 running, and moving direction changing motion data representing the change in posture made by the player object 58 changing the moving direction.

In addition, for example, the game data storage unit 70 stores game situation data indicating a situation of the game. Examples of the game situation data include display position data on the cursor 60, state data on the ball object 56, and state data on each player object 58. The display position data on the cursor 60 represents data that indicates the display position of the cursor 60 using a screen coordinate system. The state data on the ball object 56 represents data that indicates the state (including a position, a moving speed, and a moving direction) of the ball object 56 within the virtual three-dimensional space 50 using a world coordinate system (XwYwZw-coordinate system illustrated in FIG. 5). The state data on the player object 58 represents data that indicates the state (including a position, a posture, a moving speed, and a moving direction) of the player object 58 within the virtual three-dimensional space 50 by the world coordinate system.

The designation position acquisition unit 72 is implemented mainly by the microprocessor 14, the main memory 26, and the operation input unit 31. Based on an operation signal (pointing information) supplied from the controller 32, the designation position acquisition unit 72 acquires a screen coordinate value of a designation position of the controller 32. Further, the designation position acquisition unit 72 acquires a position on the field object 52 corresponding to the screen coordinate value.

Figure 8:
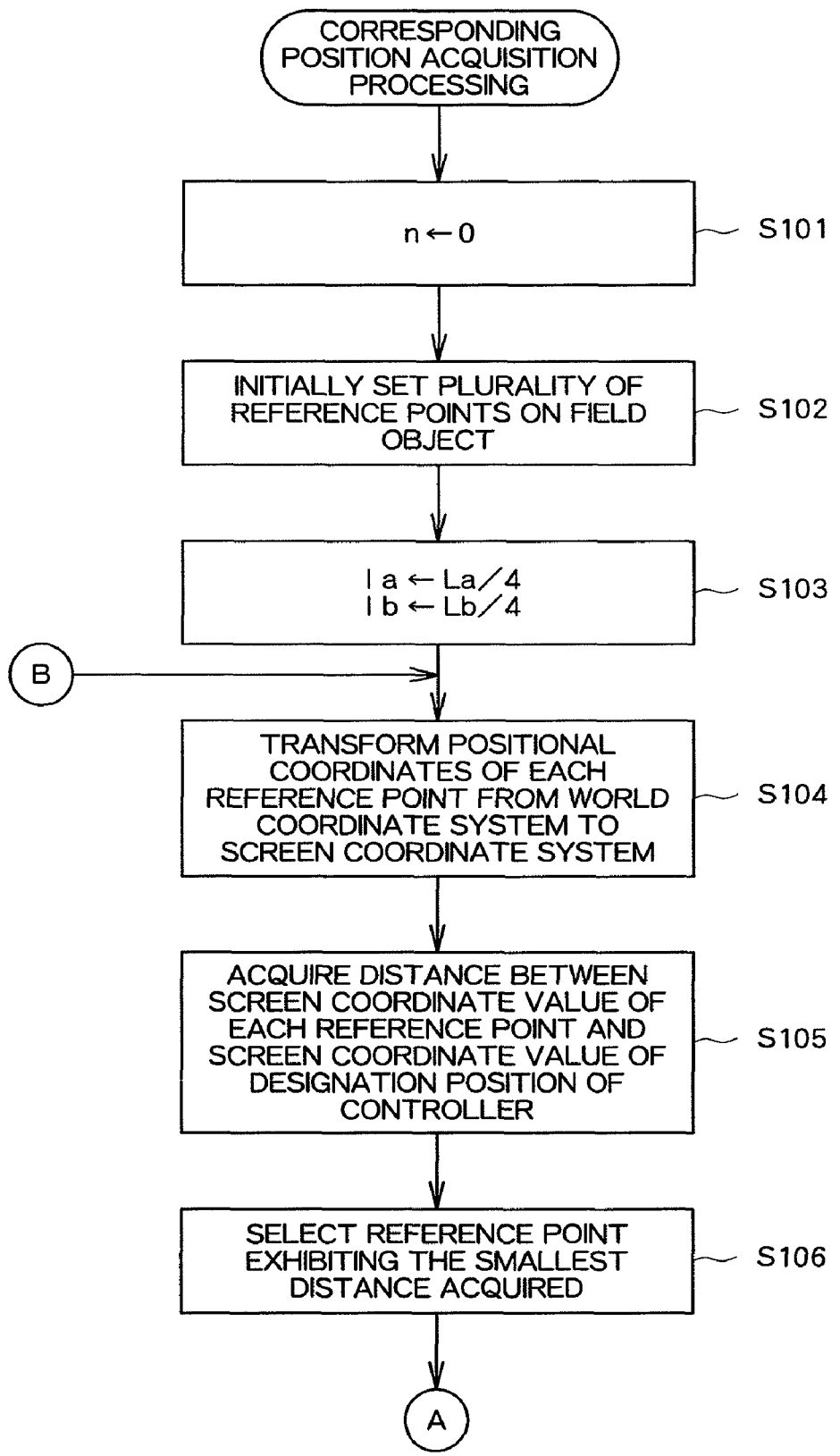
FIG. 8 is a flowchart illustrating a processing executed on the game device.
Figure 9:
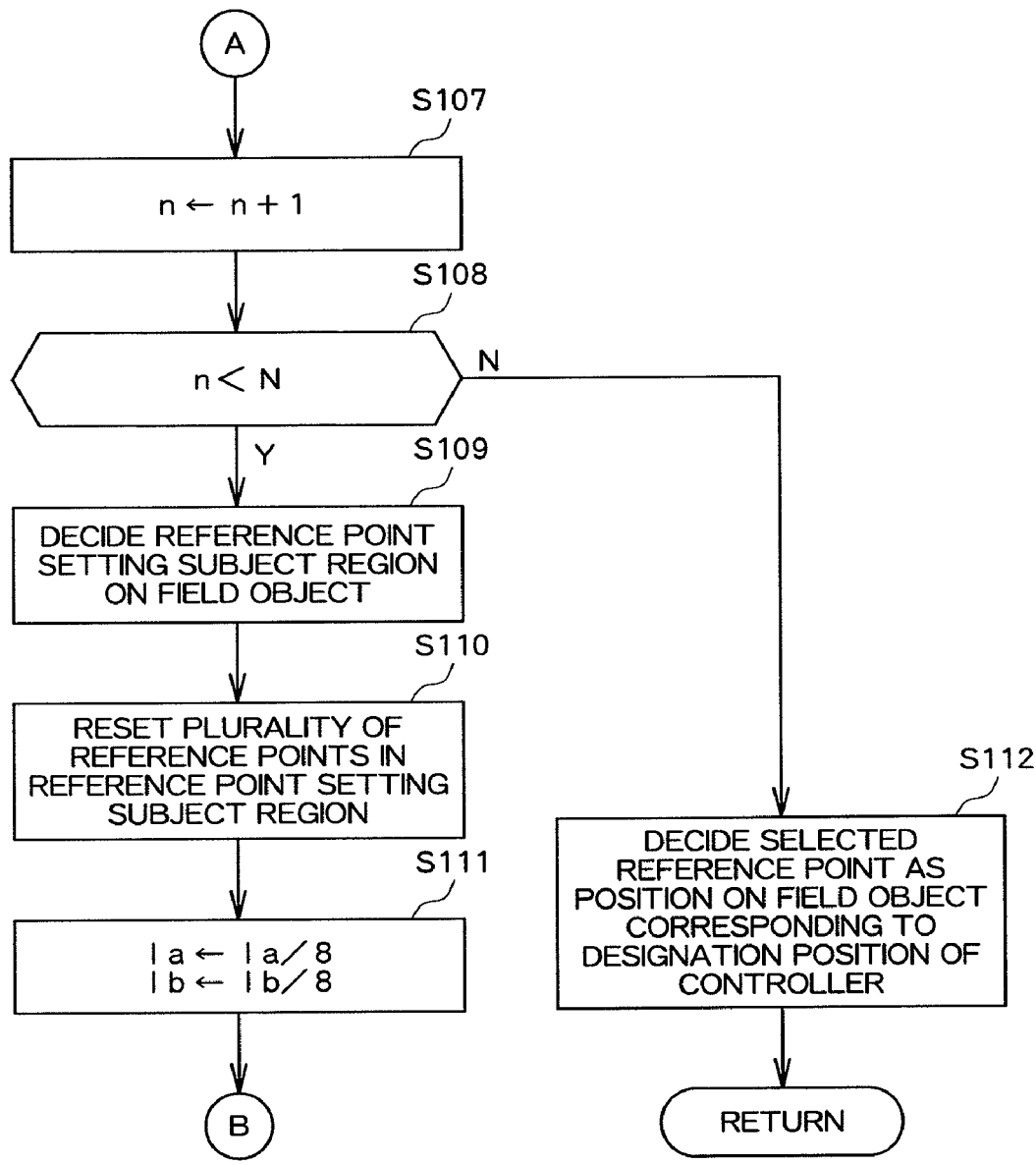
FIG. 9 is a flowchart illustrating the processing executed on the game device.

Here, description is given of processing (corresponding position acquisition processing) for acquiring the position on the field object 52 corresponding to the screen coordinate value of the designation position of the controller 32. FIGS. 8 and 9 are flowcharts illustrating the corresponding position acquisition processing.

Figure 10:
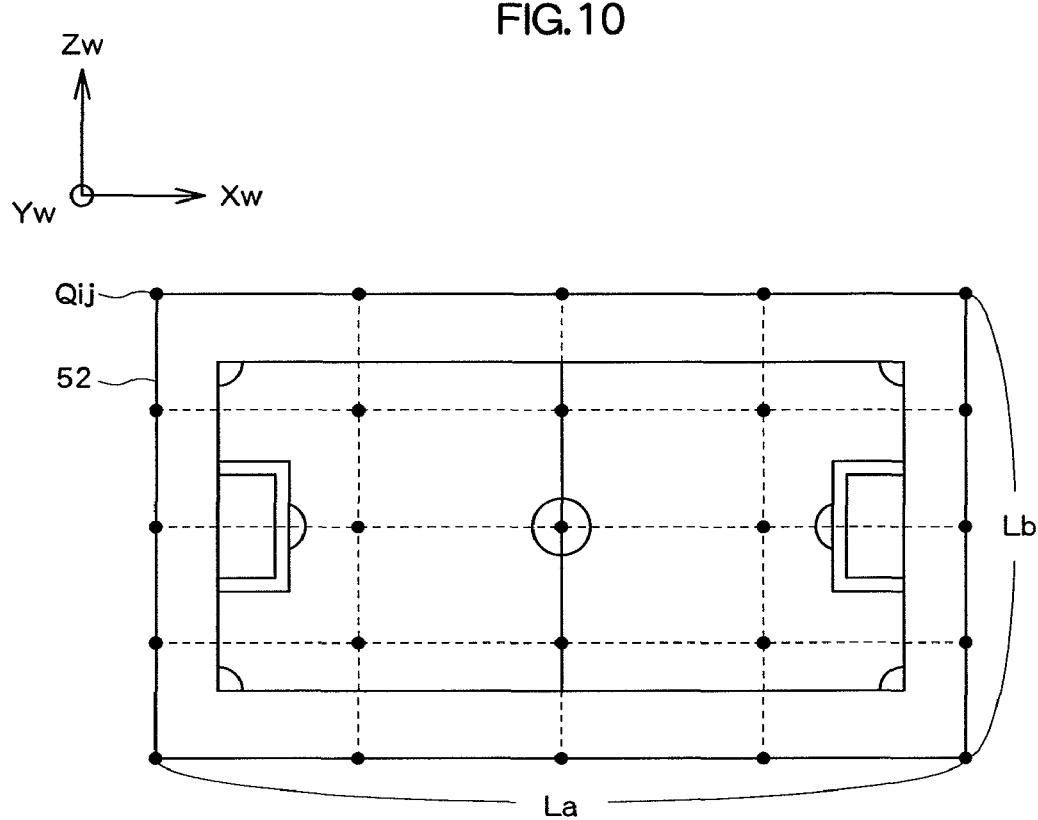
FIG. 10 is a diagram for describing an initial setting of a reference point.

As illustrated in FIG. 8, the designation position acquisition unit 72 first initializes a value of a variable "n" to 0 (S101). Further, the designation position acquisition unit 72 initially sets a plurality of reference points on the field object 52 (S102). FIG. 10 is a diagram for describing the initial setting of the reference points. As illustrated in FIG. 10, the designation position acquisition unit 72 acquires each vertex of blocks obtained by dividing each side of the field object 52 into four along a long-side direction and a short-side direction, as a reference point $Q_{ij}$ (where "i" and "j" are each an integer selected from 1 to 5). Here, the reference point $Q_{11}$ denotes a reference point on the top left, while the reference point $Q_{15}$ denotes a reference point on the top right. Similarly, the reference point $Q_{51}$ denotes a reference point on the bottom left, while the reference point $Q_{55}$ denotes a reference point on the bottom right.

Further, the designation position acquisition unit 72 initializes a variable "la" to La/4, and initializes a variable "lb" to Lb/4 (S103). Here, as illustrated in FIG. 10, "La" denotes a length of a long side of the field object 52, while "Lb" denotes a length of a short side of the field object 52.

After that, the designation position acquisition unit 72 transforms positional coordinates of each reference point $Q_{ij}$ from the world coordinate system to the screen coordinate system to thereby acquire the screen coordinate value corresponding to each reference point $Q_{ij}$ (S104). Here, the same matrix calculation is used as the matrix calculation used in the case of generating a field-of-view image showing the state of the virtual three-dimensional space 50 viewed from the virtual camera 59.

After that, with regard to each reference point $Q_{ij}$, the designation position acquisition unit 72 calculates a distance between the screen coordinate value corresponding to the reference point $Q_{ij}$ and the screen coordinate value of the designation position of the controller 32 (S105). Then, the designation position acquisition unit 72 selects a reference point $Q_{ij}$ exhibiting the smallest distance calculated in Step S105 from among the plurality of reference points $Q_{ij}$ (S106). Further, the designation position acquisition unit 72 adds 1 to the value of the variable "n" (S107). Then, the designation position acquisition unit 72 judges whether or not the value of the variable "n" is smaller than "N" (S108).

Figure 11:
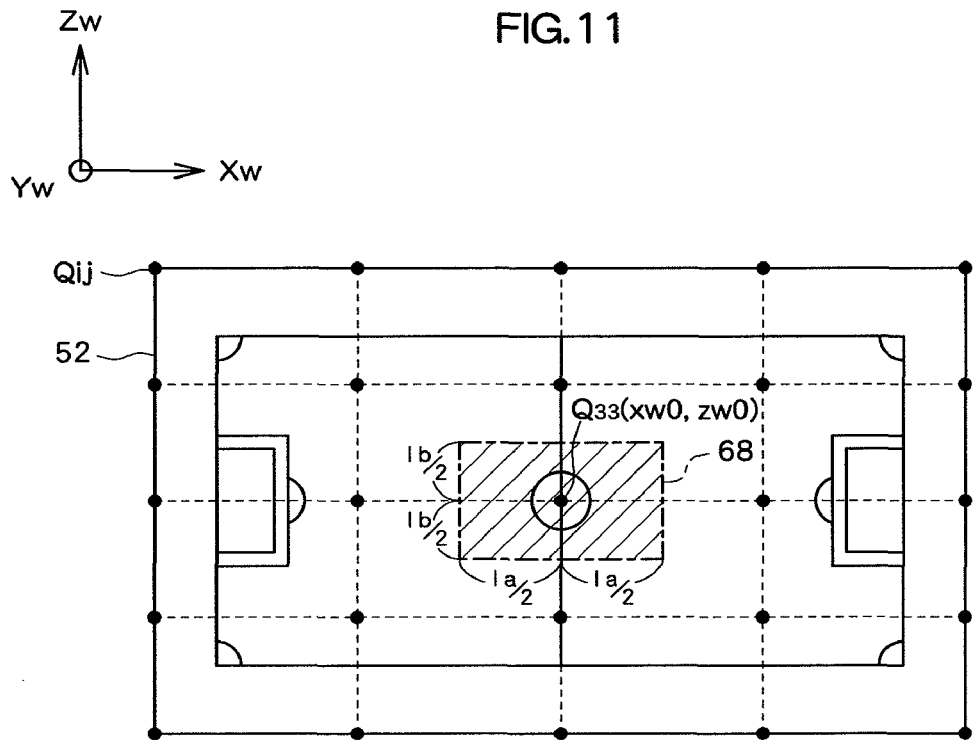
FIG. 11 is a diagram for describing a reference point setting subject region.

If the value of the variable "n" is smaller than "N", the designation position acquisition unit 72 decides a reference point setting subject region on the field object 52 based on the reference point $Q_{ij}$ selected in Step S106 (S109). FIG. 11 is a diagram for describing the reference point setting subject region. Here, FIG. 11 illustrates the reference point setting subject region in a case where the reference point $Q_{33}$ is selected in Step S106 with the reference point $Q_{ij}$ set as illustrated in FIG. 10. As illustrated in FIG. 11, the designation position acquisition unit 72 sets a region on the field object 52, which includes the Xw-axis coordinate and the Zw-axis coordinate (xw, zw) that satisfy the following conditions (1) and (2), as a reference point setting subject region 68. Note that in the following conditions (1) and (2), (xw0, zw0) represents the Xw-axis coordinate and the Zw-axis coordinate of the reference point $Q_{ij}$ selected in Step S106, respectively.

$$xw0-(la/2) \leq xw \leq xw0+(la/2) \quad (1)$$

$$zw0-(la/2) \leq zw \leq zw0+(lb/2) \quad (2)$$

Figure 12:
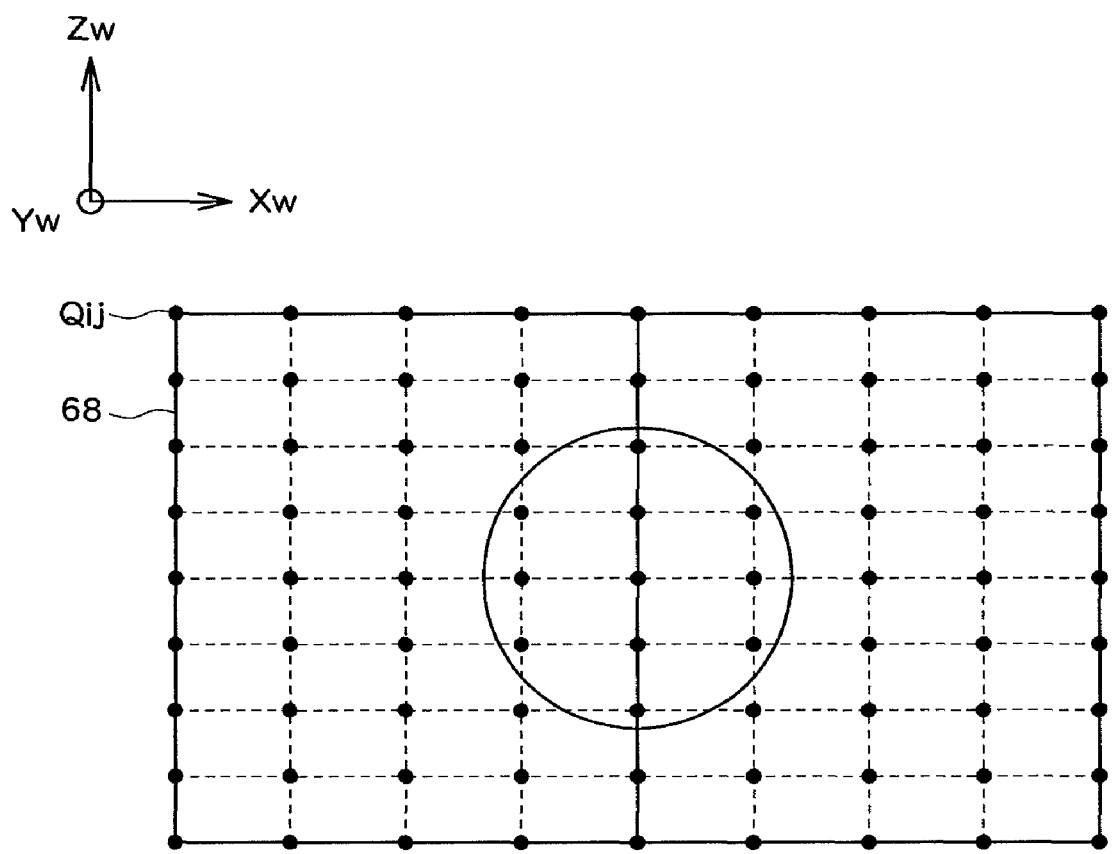
FIG. 12 is a diagram for describing a resetting of the reference point.

Then, the designation position acquisition unit 72 resets a plurality of reference points in the reference point setting subject region 68 decided in Step S109 (S110). FIG. 12 is a diagram for describing the resetting of the reference points. Here, FIG. 12 illustrates a case where the reference point setting subject region 68 is decided as illustrated in FIG. 11. As illustrated in FIG. 12, the designation position acquisition unit 72 sets each vertex of each of blocks obtained by dividing each side of the reference point setting subject region 68 into eight along the long-side direction and the short-side direction, as a new reference point $Q_{ij}$ (where "i" and "j" are each an integer selected from 1 to 9). Here, the reference point $Q_{11}$ denotes the reference point on the top left, while the reference point $Q_{19}$ denotes the reference point on the top right. Similarly, the reference point $Q_{91}$ denotes the reference point on the bottom left, while the reference point $Q_{99}$ denotes the reference point on the bottom right.

After resetting the reference points $Q_{ij}$, the designation position acquisition unit 72 updates the variable "la" to la/8, and updates the variable "lb" to lb/8 (S111). After that, the designation position acquisition unit 72 again executes the processing from Step S104.

Meanwhile, if it is judged in Step S108 that the value of the variable "n" is not smaller than "N", the designation position acquisition unit 72 judges that the reference point $Q_{ij}$ selected in Step S106 is a position on the field object 52 corresponding to the screen coordinate value of the designation position of the controller 32 (S112).

The game situation data update unit 74 is implemented mainly by the microprocessor 14 and the main memory 26. The game situation data update unit 74 updates the game situation data stored in the game data storage unit 70 based on an acquisition result obtained by the designation position acquisition unit 72.

For example, the game situation data update unit 74 updates the display position data on the cursor 60 stored in the game data storage unit 70 based on the screen coordinate value of the designation position of the controller 32 acquired by the designation position acquisition unit 72.

Further, for example, in a case where the movement target position is not set for the user object 58a, the game situation data update unit 74 updates the state data on the user object 58a so that the user object 58a moves toward the position on the field object 52 acquired by the designation position acquisition unit 72. For example, the game situation data update unit 74 updates the moving direction of the user object 58a to a "direction from the current position of the user object 58a toward the position on the field object 52 acquired by the designation position acquisition unit 72". Further, for example, the game situation data update unit 74 updates the position of the user object 58a to a "position to which the movement has been made from the current position along the moving direction by a distance corresponding to the moving speed" every predetermined time (in this embodiment, $1/60^{th}$ of a second). Further, for example, the game situation data update unit 74 updates the posture of the user object 58a based on, for example, the running motion data every predetermined time (in this embodiment, $1/60^{th}$ of a second).

Further, for example, the game situation data update unit 74 judges whether or not the kick instructing button has been depressed based on the operation signal supplied from the controller 32. If the kick instructing button has been depressed, the game situation data update unit 74 updates the state data on the user object 58a so that the user object 58a performs a kick operation. Further, the game situation data update unit 74 updates the state data on the ball object 56 so that the ball object 56 moves toward the position on the field object 52 acquired by the designation position acquisition unit 72.

The game situation data update unit 74 includes a movement target position setting unit 78, a first judgment unit 80, a second judgment unit 82, a first intersection acquisition unit 84, a second intersection acquisition unit 86, and a movement control unit 88. Those functional blocks are described later.

The display control unit 76 is implemented mainly by the microprocessor 14, the image processing unit 16, and the main memory 26. The display control unit 76 generates the game screen 18a. First, the display control unit 76 renders a field-of-view image showing the state of the virtual three-dimensional space 50 viewed from the virtual camera 59 in the VRAM based on various kinds of data stored in the game data storage unit 70. The field-of-view image is generated by coordinate-transforming vertex coordinates (world coordinate value) of a polygon composing each object located in the virtual three-dimensional space 50 to the screen coordinate system by using a predetermined matrix calculation. After that, the display control unit 76 renders the cursor 60 over the field-of-view image rendered in the VRAM. At this time, a rendering position of the cursor 60 is identified based on the display position data on the cursor 60 stored in the game data storage unit 70.

Here, description is given of the movement target position setting unit 78, the first judgment unit 80, the second judgment unit 82, the first intersection acquisition unit 84, the second intersection acquisition unit 86, and the movement control unit 88.

First described is the movement target position setting unit 78. The movement target position setting unit 78 judges whether or not the movement target position setting button has been depressed based on the operation signal supplied from the controller 32. If the movement target position setting button has been depressed, the movement target position setting unit 78 causes the position on the field object 52 corresponding to the designation position (screen coordinate value) of the controller 32 at that time point to be stored in the main memory 26 as the movement target position.

In the case where the movement target position is set for the user object 58a, the game situation data update unit 74 updates the state data on the user object 58a so that the user object 58a moves toward the movement target position. For example, the game situation data update unit 74 updates the moving direction of the user object 58a to a "direction from the current position of the user object 58a toward the movement target position". Further, for example, the game situation data update unit 74 updates the position of the user object 58a to the "position to which the movement has been made from the current position along the moving direction by the distance corresponding to the moving speed" every predetermined time (in this embodiment, $1/60^{th}$ of a second). Further, for example, the game situation data update unit 74 updates the posture of the user object 58a based on, for example, the running motion data every predetermined time (in this embodiment, $1/60$th of a second).

Next described are the first judgment unit 80 and the second judgment unit 82.

In a case where the user object 58a is located within the pitch 52a, the first judgment unit 80 judges whether or not the position outside the pitch 52a (for example, the position 62 illustrated in FIG. 18) has been set as the movement target position (hereinafter, referred to as "first movement target position").

In a case where the first movement target position for the user object 58a located within the pitch 52a is set outside the pitch 52a, that is, in a case where the user object 58a located within the pitch 52a moves toward the first movement target position set outside the pitch 52a, the second judgment unit 82 judges whether or not the position within the pitch 52a (for example, position 64 illustrated in FIG. 18) has been set as a new movement target position (hereinafter, referred to as "second movement target position").

Figure 13:
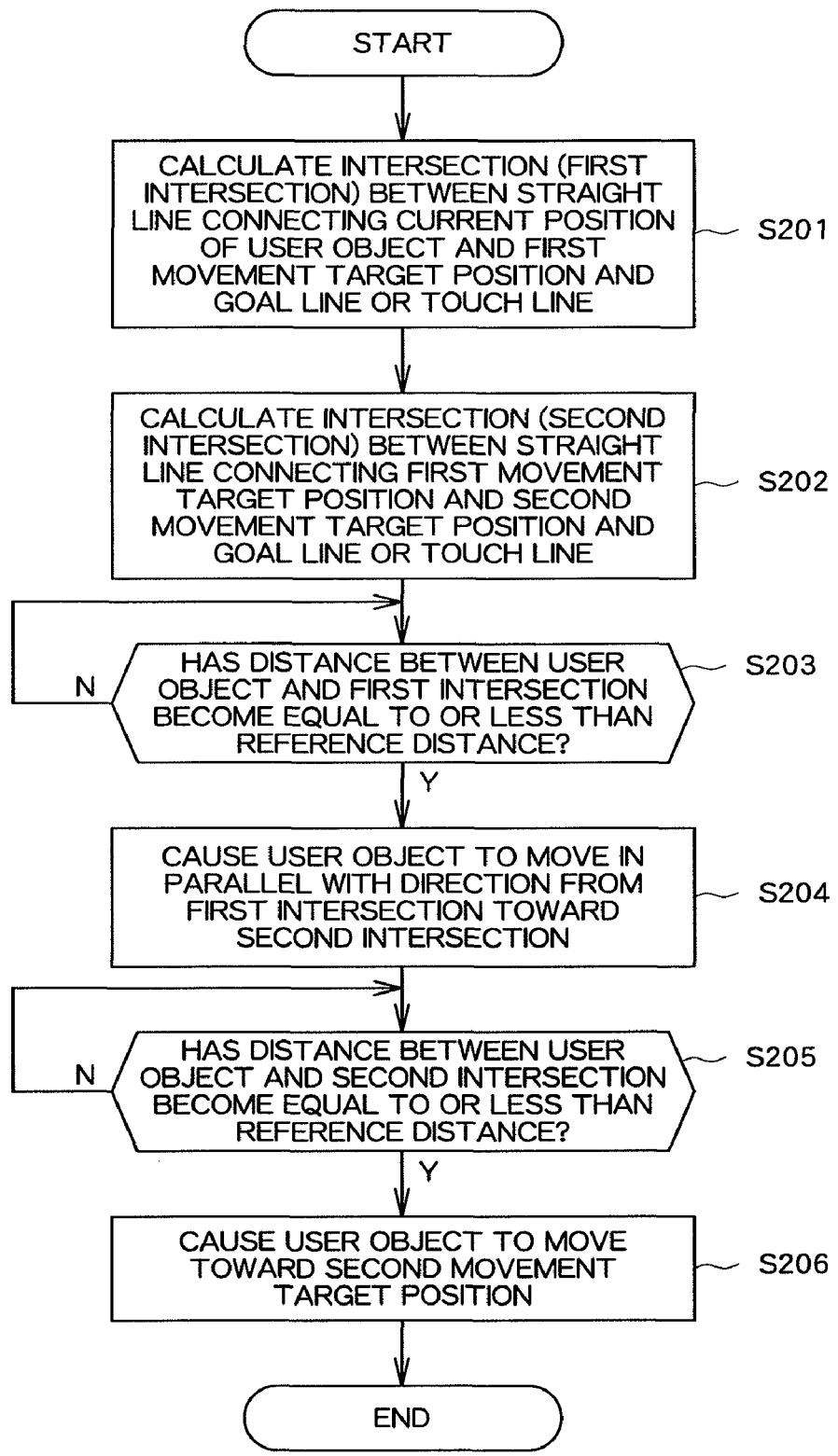
FIG. 13 is a flowchart illustrating the processing executed on the game device.

Next described are the first intersection acquisition unit 84, the second intersection acquisition unit 86, and the movement control unit 88. FIG. 13 is a flowchart mainly illustrating processing related to the present invention among processing (program) executed by the game device 10 if the second judgment unit 82 judges that the second movement target position is set within the pitch 52a. Further, FIG. 14 is a diagram for explaining contents of the processing.

If the second judgment unit 82 judges that the position 64 within the pitch 52a is set as the second movement target position while the user object 58a is moving toward the position 62 (first movement target position) outside the user object 58a, first, the first intersection acquisition unit 84 calculates an intersection 92 (first intersection) between a straight line 90 connecting the current position of the user object 58a and the first movement target position (position 62), and the goal line 53a or the touch line 53b (touch line 53b of FIG. 14) (S201).

Subsequently, the second intersection acquisition unit 86 calculates an intersection 96 (second intersection) between a straight line 94 connecting the first movement target position (position 62) and the second movement target position (position 64) and the goal line 53a or the touch line 53b (touch line 53b of FIG. 14) (S202).

Subsequently, the movement control unit 88 monitors whether or not a distance between the user object 58a and the intersection 92 has become equal to or less than a reference distance (S203). That is, the movement control unit 88 monitors whether or not the user object 58a has arrived at a region having a distance from the intersection 92 equal to or less than the reference distance.

If the distance between the user object 58a and the intersection 92 becomes equal to or less than the reference distance, the movement control unit 88 causes the user object 58a to move in parallel with a direction from the intersection 92 toward the intersection 96 at that time point (S204). At this time, the movement control unit 88 updates the moving direction of the user object 58a based on the direction from the intersection 92 toward the intersection 96. In addition, at this time, the movement control unit 88 updates the posture of the user object 58a based on the moving direction changing motion data. After that, the movement control unit 88 updates the position of the user object 58a to the "position to which the movement has been made from the current position along the moving direction by the distance corresponding to the moving speed" at predetermined intervals (in this embodiment, $\frac{1}{60}^{th}$ of a second). Further, at that time, the movement control unit 88 updates the posture of the user object 58a based on the running motion data.

Subsequently, the movement control unit 88 monitors whether or not a distance between the user object 58a and the intersection 96 has become equal to or less than a reference distance (S205). That is, the movement control unit 88 monitors whether or not the user object 58a has arrived at a region having a distance from the intersection 96 equal to or less than the reference distance.

If the distance between the user object 58a and the intersection 96 becomes equal to or less than the reference distance, the movement control unit 88 causes the user object 58a to move toward the second movement target position (position 64) (S206). At this time, the movement control unit 88 updates the moving direction of the user object 58a to a direction toward the second movement target position (position 64). In addition, at this time, the movement control unit 88 updates the posture of the user object 58a based on the moving direction changing motion data. After that, the movement control unit 88 updates the position of the user object 58a to the "position to which the movement has been made from the current position along the moving direction by the distance corresponding to the moving speed" at predetermined intervals (in this embodiment, $\frac{1}{60}^{th}$ of a second). Further, at that time, the movement control unit 88 updates the posture of the user object 58a based on the running motion data.

FIG. 15 illustrates an example of a moving path of the user object 58a. As a result of execution of the processing illustrated in FIG. 13, the user object 58a moves along a moving path 98 illustrated in FIG. 15. In this case, an angle θ1 between a moving direction of the user object 58a moving toward the first movement target position (position 62) and a moving direction of the user object 58a moving in parallel with the touch line 53b becomes smaller than the conventional example (angle θ illustrated in FIG. 19) in which the moving direction of the user object 58a is changed at one time. In addition, an angle θ2 between the moving direction of the user object 58a moving in parallel with the touch line 53b and a moving direction of the user object 58a moving toward the second movement target position (position 64) also becomes smaller than the conventional example (angle θ illustrated in FIG. 19) in which the moving direction of the user object 58a is changed at one time. As a result, the user object 58a is prevented from exhibiting an unnatural action at the time of changing the moving direction.

According to the game device 10 described above, even in the case where the movement target position has been erroneously set outside the pitch 52a, it becomes possible for the user to instruct the user object 58a to stay within the pitch 52a without having to cancel the movement target position if a new movement target position is set within the pitch 52a. That is, such a user interface is realized as to allow the user to instruct the user object 58a to stay within the pitch 52a without having to cancel the movement target position in the case where the user has erroneously set the movement target position for the user object 58a outside the pitch 52a.

Further, according to the game device 10, since the moving direction of the user object 58a is changed in two phases, the angle (angle θ1 or angle θ2 illustrated in FIG. 15) used for changing the moving direction of the user object 58a becomes more moderate than the angle (angle θ illustrated in FIG. 19) for changing the moving direction of the user object 58a at a time. Therefore, it is possible to prevent the user object 58a from exhibiting an unnatural action at the time of changing the moving direction. That is, the user interface as described above is realized while ensuring prevention of the user object 58a from exhibiting an unnatural action at the time of changing the moving direction.

Note that the present invention is not limited to the embodiment described above.

For example, in Step S203, the reference distance may be varied based on a movement mode of the user object 58a. The movement mode of the user object 58a represents, for example, a moving action type or a moving speed.

Herein, description is given of a case where the reference distance is varied based on the moving action type of the user object 58a. In this case, the game data storage unit 70 stores therein a reference distance table in which a condition related to the moving action type and a reference distance are associated with each other. FIG. 16 is a diagram illustrating an example of the reference distance table. In the reference distance table illustrated in FIG. 16, a reference distance L1 is associated with "normal running", while a reference distance L2 (>L1) is associated with "dash running". Note that the "dash running" is a movement mode faster in moving speed than the "normal running".

In Step S203, the movement control unit 88 acquires the reference distance corresponding to the moving action type of the user object 58a moving toward the first movement target position (intersection 92) based on the reference distance table. Then, the movement control unit 88 uses the acquired reference distance.

If the user object 58a is configured to perform an action of changing the moving direction while keeping the movement, the action of the user object 58a can be improved in terms of reality. However, in this case, if the above-mentioned reference distance is set in accordance with a case where the user object 58a performs the "normal running", the user object 58a performing the "dash running" may not move out of the pitch 52a while changing the moving direction. In this respect, if the reference distance is configured to be decided based on the reference distance table as described above, it is possible to set the reference distance in accordance with the moving action type of the user object 58a. As a result, it becomes possible to prevent the occurrence of an inconvenience that the user object 58*a* moves out of the pitch 52*a* while changing the moving direction.

Note that also in Step S205, the reference distance may vary based on the movement mode of the user object 58*a*.

Further, for example, only if the angle θ (corresponding to the angle θ illustrated in FIG. 19) between a direction from the intersection 92 toward the first movement target position (position 62) and a direction from the intersection 92 toward the second movement target position (position 64) is equal to or larger than a reference angle, the movement control for the user object 58*a* may be performed so that the user object 58*a* moves along the path as illustrated in FIG. 15. On the other hand, if the above-mentioned angle θ is less than the reference angle, the movement control for the user object 58*a* may be performed so that the user object 58*a* moves along the path 66 as illustrated in FIG. 19. Accordingly, the user object 58*a* is caused to move along the path 98 illustrated in FIG. 15 only if the user object 58*a* may not exhibit an unnatural action at the time of changing the moving direction.

Further, for example, the game executed on the game device is not limited to the game in which the state of a three-dimensional game space constituted of three coordinate elements is displayed on the game screen 18*a*, but may be a game in which the state of a two-dimensional game space constituted of two coordinate elements is displayed on the game screen 18*a*. That is, the game executed on the game device 10 may be a game in which the positions and the like of a ball character and player characters are managed by the two coordinate elements. In this case, the movement target position setting unit 78 causes the designation position (screen coordinate value) of the controller 32 at the time point when the movement target position setting button is depressed to be stored in the main memory 26 as the movement target position.

Further, for example, the game executed on the game device 10 may be a game played by two or more users. Further, for example, the game executed on the game device 10 is not limited to the soccer game. The game executed on the game device 10 may be a sports game other than the soccer game. The game executed on the game device 10 may be a game other than the sports game.

Further, for example, the operation input unit 31 may be a touch panel. Further, for example, the operation input unit 31 may be a mouse.

Figure 17:
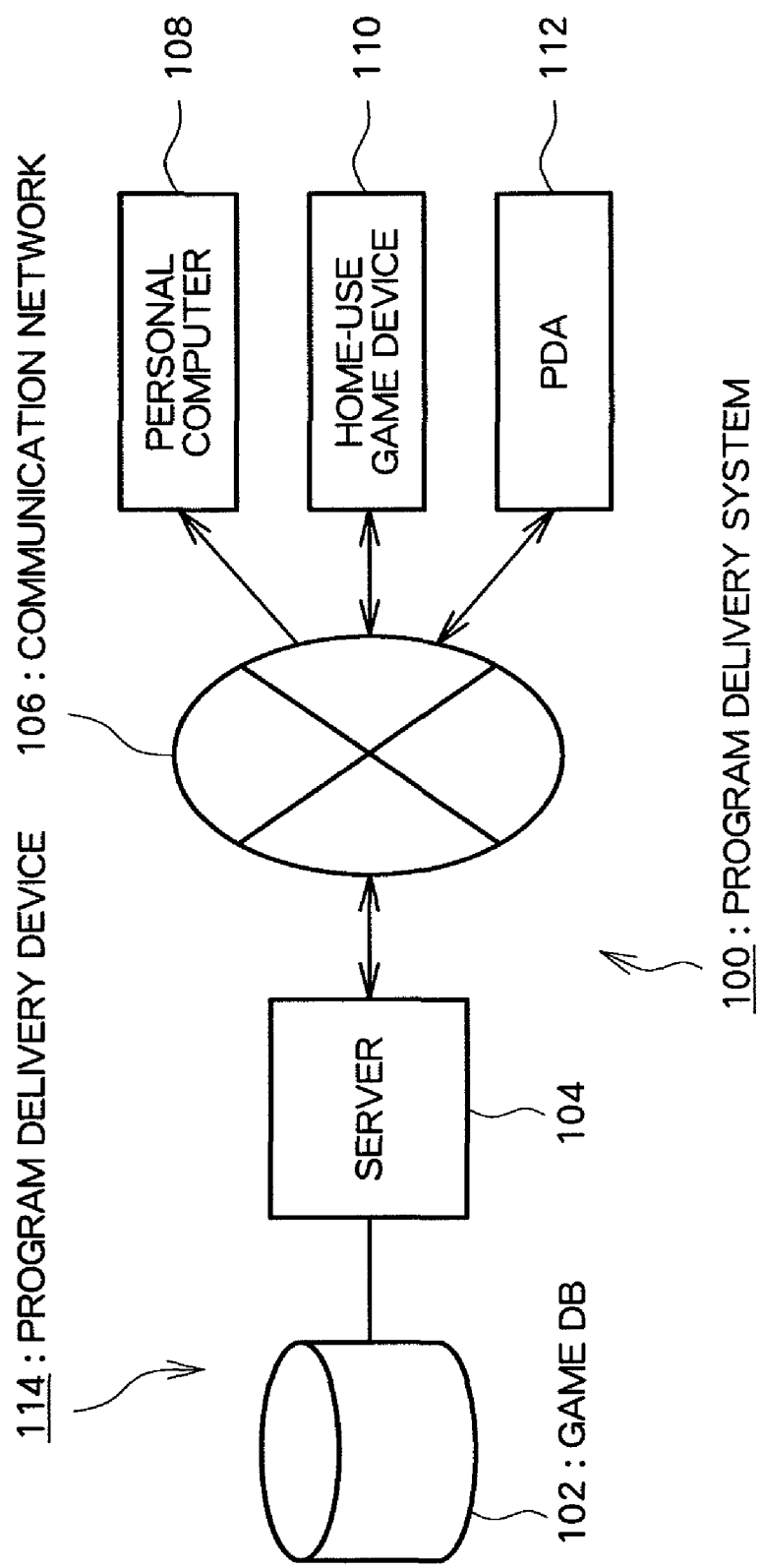
FIG. 17 is a diagram illustrating an overall configuration of a program delivery system according to another embodiment of the present invention.

Further, for example, in the above-mentioned description, the program is supplied from the optical disk 25 serving as an information storage medium to the home-use game device 11, but the program may be delivered to a household or the like via a communication network. FIG. 17 is a diagram illustrating an overall configuration of a program delivery system using the communication network. Based on FIG. 17, description is given of a program delivery method according to the present invention. As illustrated in FIG. 17, this program delivery system 100 includes a game database 102, a server 104, a communication network 106, a personal computer 108, a home-use game device 110, and a personal digital assistant (PDA) 112. Of those, the game database 102 and the server 104 constitute a program delivery device 114. The communication network 106 includes, for example, the Internet and a cable television network. In this system, the same program as storage contents of the optical disk 25 is stored in the game database (information storage medium) 102. A demander uses the personal computer 108, the home-use game device 110, or the PDA 112 to make a game delivery request, and hence the game delivery request is transferred to the server 104 via the communication network 106. Then, the server 104 reads the program from the game database 102 according to the game delivery request, and transmits the program to a game delivery request source such as the personal computer 108, the home-use game device 110, and the PDA 112. Here, the game delivery is performed according to the game delivery request, but the server 104 may transmit the program one way. In addition, all of programs necessary to implement the game are not necessarily delivered at one time (delivered collectively), and necessary parts may be delivered depending on which phase the game is in (split and delivered). By thus performing the game delivery via the communication network 106, the demander can obtain the program with ease.

The invention claimed is:

1. A game device, which executes a game in which a mobile character moves toward a movement target position designated by a user, comprising:

first judgment unit configured to judge whether or not a position outside a predetermined region has been designated as a first movement target position for the mobile character in a case where the mobile character is located within the predetermined region;

second judgment unit configured to judge whether or not a position within the predetermined region has been designated as a second movement target position for the mobile character after it is judged by the first judgment unit that the position outside the predetermined region has been designated as the first movement target position in the case where the mobile character is located within the predetermined region;

first intersection acquisition unit configured to acquire a first intersection between a straight line connecting a current position of the mobile character and the first movement target position and a boundary line of the predetermined region if it is judged by the first judgment unit that the position outside the predetermined region has been designated as the first movement target position;

second intersection acquisition unit configured to acquire a second intersection between a straight line connecting the first movement target position and the second movement target position, and the boundary line of the predetermined region, if it is judged by the second judgment unit that the position within the predetermined region has been designated as the second movement target position; and movement control unit configured to execute movement control for the mobile character based on the first intersection and the second intersection, wherein the movement control unit further configured to:
move the mobile character toward the first movement target position if it is judged by the first judgment unit that the position outside the predetermined region has been designated as the first movement target position;
judge whether or not the mobile character has arrived at a region whose distance from the first intersection is equal to or less than a first reference distance;
move the mobile character in parallel with a direction from the first intersection toward the second intersection if it is judged that the mobile character has arrived at the region whose distance from the first intersection is equal to or less than the first reference distance;
judge whether or not the mobile character has arrived at a region whose distance from the second intersection is equal to or less than a second reference distance; and
move the mobile character toward the second movement target position if it is judged that the mobile character has arrived at the region whose distance from the second intersection is equal to or less than the second reference distance, wherein at least one of the first judgment unit, the second judgment unit, the first intersection acquisition unit, the second intersection acquisition unit, and the movement control unit, is implemented by a processor.

2. A game device according to claim 1, wherein the movement control unit further comprises:

reference distance information storage unit which stores reference distance information in which a movement mode condition for a movement mode of the mobile character and a reference distance are associated with each other; and deciding unit configured to decide, as the first reference distance, the reference distance associated with the movement mode condition satisfied by a movement mode of the mobile character moving toward the first movement target position.

3. A control method for a game device which executes a game in which a mobile character moves toward a movement target position designated by a user, comprising:

a first judgment operation of judging whether or not a position outside a predetermined region has been designated as a first movement target position for the mobile character in a case where the mobile character is located within the predetermined region;

a second judgment operation of judging whether or not a position within the predetermined region has been designated as a second movement target position for the mobile character after it is judged in the first judgment operation that the position outside the predetermined region has been designated as the first movement target position in the case where the mobile character is located within the predetermined region;

a first intersection acquisition operation of acquiring a first intersection between a straight line connecting a current position of the mobile character and the first movement target position and a boundary line of the predetermined region if it is judged in the first judgment operation that the position outside the predetermined region has been designated as the first movement target position;

a second intersection acquisition operation of acquiring a second intersection between a straight line connecting the first movement target position and the second movement target position, and the boundary line of the predetermined region, if it is judged in the second judgment operation that the position within the predetermined region has been designated as the second movement target position; and a movement control operation of executing movement control for the mobile character based on the first intersection and the second intersection, wherein the movement control operation includes the operations of:

moving the mobile character toward the first movement target position if it is judged in the first judgment operation that the position outside the predetermined region has been designated as the first movement target position;

judging whether or not the mobile character has arrived at a region whose distance from the first intersection is equal to or less than a first reference distance;

moving the mobile character in parallel with a direction from the first intersection toward the second intersection if it is judged that the mobile character has arrived at the region whose distance from the first intersection is equal to or less than the first reference distance;

judging whether or not the mobile character has arrived at a region whose distance from the second intersection is equal to or less than a second reference distance; and moving the mobile character toward the second movement target position if it is judged that the mobile character has arrived at the region whose distance from the second intersection is equal to or less than the second reference distance, wherein at least one of the first judgment operation, the second judgment operation, the first intersection acquisition operation, the second intersection acquisition operation, and the movement control operation, is implemented by a processor.

4. A computer-readable memory storing a program causing a computer to function as a game device which executes a game in which a mobile character moves toward a movement target position designated by a user, the program causing the computer to function as:

first judgment unit configured to judge whether or not a position outside a predetermined region has been designated as a first movement target position for the mobile character in a case where the mobile character is located within the predetermined region;

second judgment unit configured to judge whether or not a position within the predetermined region has been designated as a second movement target position for the mobile character after it is judged by the first judgment unit that the position outside the predetermined region has been designated as the first movement target position in the case where the mobile character is located within the predetermined region;

first intersection acquisition unit configured to acquire a first intersection between a straight line connecting a current position of the mobile character and the first movement target position and a boundary line of the predetermined region if it is judged by the first judgment unit that the position outside the predetermined region has been designated as the first movement target position;

second intersection acquisition unit configured to acquire a second intersection between a straight line connecting the first movement target position and the second movement target position, and the boundary line of the predetermined region, if it is judged by the second judgment unit that the position within the predetermined region has been designated as the second movement target position; and movement control unit configured to execute movement control for the mobile character based on the first intersection and the second intersection, wherein the movement control unit further configured to:

move the mobile character toward the first movement target position if it is judged by the first judgment unit that the position outside the predetermined region has been designated as the first movement target position;

judge whether or not the mobile character has arrived at a region whose distance from the first intersection is equal to or less than a first reference distance;

move the mobile character in parallel with a direction from the first intersection toward the second intersection if it is judged that the mobile character has arrived at the region whose distance from the first intersection is equal to or less than the first reference distance;

judge whether or not the mobile character has arrived at a region whose distance from the second intersection is equal to or less than a second reference distance; and move the mobile character toward the second movement target position if it is judged that the mobile character has arrived at the region whose distance from the second intersection is equal to or less than the second reference distance.

* * * * *